(12) United States Patent
de Oliveira

(10) Patent No.: US 9,776,883 B2
(45) Date of Patent: Oct. 3, 2017

(54) PRODUCING CALCIUM OXIDES

(71) Applicant: Clean World Technologies Ltd., Nassau (BS)

(72) Inventor: Lupércio Tarcísio de Oliveira, Belo Horizonte (BR)

(73) Assignee: Clean World Technologies Ltd., Nassau (BS)

( * ) Notice: Subject to any disclaimer, the term of this patent is extended or adjusted under 35 U.S.C. 154(b) by 0 days.

(21) Appl. No.: 15/276,234

(22) Filed: Sep. 26, 2016

(65) Prior Publication Data

US 2017/0088434 A1    Mar. 30, 2017

Related U.S. Application Data

(60) Provisional application No. 62/246,796, filed on Oct. 27, 2015, provisional application No. 62/232,961, filed on Sep. 25, 2015, provisional application No. 62/232,999, filed on Sep. 25, 2015.

(51) Int. Cl.
*C01F 11/06* (2006.01)

(52) U.S. Cl.
CPC .......... *C01F 11/06* (2013.01); *C01P 2004/60* (2013.01); *C01P 2006/12* (2013.01); *C01P 2006/14* (2013.01); *C01P 2006/80* (2013.01)

(58) Field of Classification Search
CPC ... C01F 11/06; C01P 2004/60; C01P 2006/12; C01P 2006/14; C01P 2006/80; Y10T 428/2982
USPC .......................................................... 428/402
See application file for complete search history.

(56) References Cited

U.S. PATENT DOCUMENTS

| 4,552,683 A * | 11/1985 | Powell ................. B01D 53/508 252/189 |
| 4,748,010 A * | 5/1988 | Walker ....................... C04B 2/10 423/175 |
| 7,972,667 B2 | 7/2011 | Baune et al. |
| 8,226,917 B2 * | 7/2012 | Fan ..................... B01D 53/1475 423/244.03 |
| 2006/0093540 A1 * | 5/2006 | Fan ..................... B01D 53/1475 423/247 |
| 2009/0246524 A1 | 10/2009 | Ohmi et al. |
| 2013/0309308 A1 | 11/2013 | Fazan et al. |

FOREIGN PATENT DOCUMENTS

| EP | 0 026 090 | 9/1983 |
| EP | 0 543 765 | 5/1993 |
| EP | 1 887 275 | 2/2008 |
| SU | 1296511 | 3/1987 |

OTHER PUBLICATIONS

Martyn, Kenny et al., "Lime and Limestone" In: Ullmann's Encyclopedia of Industrial Chemistry, pp. 37-69 (2007).
Bilton, Matthew William, "Nanoparticulate hydroxyapatite and calcium-based $CO_2$ sorbents," Ph.D. Thesis, University of Leeds (2012).
Notification of Transmittal of the International Search Report and the Written Opinion of the International Searching Authority, or the Declaration for International Application No. PCT/IB2016/055758, dated Dec. 22, 2016, 13 pages.

* cited by examiner

*Primary Examiner* — Leszek Killman
(74) *Attorney, Agent, or Firm* — Fish & Richardson P.C.

(57) ABSTRACT

The disclosure features methods that include obtaining a first plurality of particles that include calcium carbonate, where the particles have a distribution of sizes between 8 mm and 12 mm, and heating the first plurality of particles to a temperature of between 900° C. and 1200° C. for a time period of at least 1 hour to generate a second plurality of particles that include calcium oxide.

26 Claims, 9 Drawing Sheets

PRODUCING CALCIUM OXIDES

CROSS-REFERENCE TO RELATED APPLICATIONS

This application claims priority to the following U.S. Provisional Patent Applications, the entire contents of each of which are incorporated herein by reference: 62/232,961, filed on Sep. 25, 2015; 62/232,999, filed on Sep. 25, 2015; and 62/246,796, filed on Oct. 27, 2015.

TECHNICAL FIELD

This disclosure relates to calcium phosphate compositions and methods for producing such compositions.

BACKGROUND

Calcium phosphates are a family of compounds that include calcium (II) and orthophosphate ions. Other ions such as hydroxide ions can also be present. Calcium phosphates are important industrial materials and are used for a variety of applications including fertilizer production, baking, nutritional supplementation, dentistry, and medicine.

SUMMARY

Calcium phosphate compounds can be obtained through direct recovery operations and industrial manufacturing. Direct recovery operations such as mining present significant challenges. Among these are the difficulty of locating and recovering calcium phosphate compounds of desired composition, since calcium phosphates vary in composition. Other difficulties including refining recovered products to reduce impurities, which are present in virtually all naturally occurred calcium phosphate sources.

Conventional industrial methods of production are also limited in a number of ways. While calcium phosphate compositions can be produced with a certain range of variability in composition, exerting reproducible control over a wide range of compositions is difficult. Furthermore, conventional industrial processes rely on large volumes of reagents, some of which are relatively expensive, to produce useful products. Furthermore, conditions that are used to manufacture certain types of economically valuable calcium phosphate compounds such as hydroxyapatite yield products at high economic cost.

This disclosure features methods for controlled, low cost production of a wide variety of calcium phosphate compositions in a relatively straightforward production process. The methods can be varied systematically to yield products with predictable composition. In addition, the methods can be adjusted to yield products with controlled variation in physical properties such as specific surface area, crystallinity, and particle size. Accordingly, the methods disclosed herein provide for economically feasible and controllable synthesis of a wide variety of calcium phosphate compositions on an industrial scale.

In general, in a first aspect, the disclosure features methods that include obtaining a first plurality of particles that include calcium carbonate, where the particles have a distribution of sizes between 8 mm and 12 mm, and heating the first plurality of particles to a temperature of between 900° C. and 1200° C. for a time period of at least 1 hour to generate a second plurality of particles that include calcium oxide.

Embodiments of the methods can include any one or more of the following features.

An average maximum dimension of the particles can be about 10 mm, and a full width at half maximum of a distribution of the maximum dimension of the particles can be 4 mm or less. A concentration of calcium carbonate in the first plurality of particles can be at least 94% (e.g., at least 98%). A concentration of calcium carbonate in the second plurality of particles can be less than 0.5% (e.g., less than 0.1%).

An efficiency of conversion of calcium carbonate in the first plurality of particles to calcium oxide in the second plurality of particles can be 95% or greater (e.g., 99% or greater). The first plurality of particles can be heated to a temperature of between 1100° C. and 1200° C. (e.g., to a temperature of greater than 1000° C.) to generate the second plurality of particles.

The methods can include increasing the temperature to which the first plurality of particles are heated during the time period. The methods can include increasing the temperature in a sequence of steps during the time period, where at each successive step, the first plurality of particles are heated at a constant temperature that is higher than a temperature of an immediately preceding step, for a portion of the time period. The sequence of steps can include at least three steps, where a first step in the sequence includes heating the first plurality of particles to a temperature of between 900° C. and 1000° C., a second step in the sequence includes heating the first plurality of particles to a temperature of between 1000° C. and 1100° C., and a third step in the sequence includes heating the first plurality of particles to a temperature of between 1100° C. and 1200° C.

The methods can include continuously increasing the temperature to which the first plurality of particles are heated during the time period. The methods can include increasing the temperature linearly between a first temperature of between 900° C. and 1000° C., and a second temperature of between 1100° C. and 1200° C.

The time period can be between 1 hour and 2 hours (e.g., between 2 hours and 3 hours).

The full width at half maximum of the distribution of the maximum dimension of the first plurality of particles can be 3 mm or less (e.g., 2 mm or less). A specific surface area of the second plurality of particles can be at least 10.0 m²/g. A specific porosity of the second plurality of particles can be at least 15.0 cm³/g.

Embodiments of the methods can also include any of the other features disclosed herein, including features disclosed in connection with different embodiments, in any combination except as specifically stated.

In another aspect, the disclosure features compositions that include a plurality of particles having an average maximum dimension of between 8 mm and 12 mm and featuring a calcium oxide concentration of at least 99%, where a surface area of the particles is at least 10.0 m²/g and a specific porosity of the particles is at least 15.0 cm³/g.

Embodiments of the compositions can include any one or more of the following features.

The surface area of the particles can be at least 14.0 m²/g (e.g., at least 20.0 m²/g). The specific porosity of the particles can be at least 20.0 cm³/g (e.g., at least 30.0 cm³/g).

Embodiments of the compositions can also include any of the other features disclosed herein, including features disclosed in connection with different embodiments, in any combination except as specifically stated.

In a further aspect, the disclosure features methods that include obtaining a first calcium hydroxide solution featuring a first concentration of calcium ions and a second calcium hydroxide solution featuring a second concentration of calcium ions, adding a phosphoric acid solution to the first calcium hydroxide solution to generate a combined solution that includes an aqueous suspension of calcium dihydrogen phosphate particles, and adding the second calcium hydroxide solution to the combined solution to form a product solution that includes an aqueous suspension of particles of a calcium phosphate material.

Embodiments of the methods can include any one or more of the following features.

The first and second concentrations of calcium ions can be different.

Obtaining the first calcium hydroxide solution can include combining a first plurality of particles comprising calcium oxide with water, where the particles have a specific surface area of at least 10.0 m$^2$/g. Obtaining the second calcium hydroxide solution can include combining a second plurality of the particles with water. The particles can have a specific porosity of at least 15.0 cm$^3$/g.

The methods can include adding the phosphoric acid solution to the first calcium hydroxide solution until a pH of the combined solution is between 1 and 2. The pH of the combined solution can be about 1.66.

The methods can include adding the phosphoric acid solution to the first calcium hydroxide solution in three portions, where after addition of a first one of the three portions, a pH of the first calcium hydroxide solution is between 8.5 and 9.5. Combining the first calcium hydroxide solution and the first portion of the phosphoric acid solution can form a first buffer solution of phosphate ions and biphosphate ions.

After addition of a second one of the three portions, the pH of the first calcium hydroxide solution can be between 3.5 and 4.5. Combining the first calcium hydroxide solution and the first and second portions of the phosphoric acid solution can form a second buffer solution of biphosphate ions and dihydrogen phosphate ions.

A pH of the product solution can be between 6.5 and 7.5. The pH of the product solution can be between 11.5 and 12.5.

The methods can include separating the calcium phosphate material from the product solution, and heating the calcium phosphate material to a temperature of at least 700° C. (e.g., at least 800° C., at least 900° C.) for a time period of at least 1 hour (e.g., between 1.5 hours and 2.5 hours).

The methods can include subjecting the calcium phosphate material to a thermal shock treatment by increasing a temperature of the calcium phosphate material by at least 450° C. during a time period of less than 15 minutes to expel water vapor from the calcium phosphate material.

The calcium phosphate material can include two phases, each corresponding to a different calcium phosphate compound. A first one of the phases can correspond to hydroxyapatite and a second one of the phases can correspond to β-tricalcium phosphate. A first one of the phases can correspond to hydroxyapatite and a second one of the phases can correspond to amorphous calcium phosphate. A first one of the phases can correspond to β-tricalcium phosphate and a second one of the phases can correspond to amorphous calcium phosphate.

The calcium phosphate material can include three phases, each corresponding to a different calcium phosphate compound. A first one of the phases can correspond to hydroxyapatite, a second one of the phases can correspond to β-tricalcium phosphate, and a third one of the phases can correspond to amorphous calcium phosphate. A first one of the phases can correspond to calcium hydrogen phosphate dihydrate, a second one of the phases can correspond to anhydrous calcium hydrogen phosphate, and a third one of the phases can correspond to β-tricalcium phosphate monohydrate.

The particles of the calcium phosphate material can have a crystallinity of 80% or more (e.g., 95% or more). The particles of the calcium phosphate material can have a specific surface area of 60 m$^2$/g or more (e.g., 80 m$^2$/g or more).

Embodiments of the methods can also include any of the other features disclosed herein, including features disclosed in connection with different embodiments, in any combination except as specifically stated.

In another aspect, the disclosure features compositions that include a material featuring three calcium phosphate phases that form one or more integral units of a solid, where a first one of the three phases features one or more regions formed of hydroxyapatite, where a second one of the three phases features one or more regions formed of β-tricalcium phosphate, where a third one of the three phases features one or more regions formed of amorphous calcium phosphate, and where at least some of the regions corresponding to the first, second, and third phases contact one another in the one or more integral units of the solid.

Embodiments of the compositions can include any one or more of the following features.

A concentration percentage of the hydroxyapatite in the composition can be between 5% and 95% (e.g., between 20% and 80%). A concentration percentage of the β-tricalcium phosphate in the composition can be between 10% and 80% (e.g., between 20% and 60%). A concentration percentage of the amorphous calcium phosphate can be between 10% and 80% (e.g., between 20% and 60%).

A crystallinity of the material can be at least 90% (e.g., at least 95%). A specific surface area of the material can be at least 50 m$^2$/g (e.g., at least 70 m$^2$/g). A specific porosity of the material can be at least 25 cm$^3$/g (e.g., at least 30 cm$^3$/g).

The one or more integral units can include particles, where an average maximum dimension of the particles can be between 100 nm and 500 nm, and where an average aspect ratio of the particles can be 50:1 or more. The average aspect ratio of the particles can be 100:1 or more.

Embodiments of the compositions can also include any of the other features disclosed herein, including features disclosed in connection with different embodiments, in any combination except as specifically stated.

In a further aspect, the disclosure features compositions that include a material featuring three calcium phosphate phases that form one or more integral units of a solid, where a first one of the three phases features one or more regions formed of hydroxyapatite, where a second one of the three phases features one or more regions formed of calcium hydrogen phosphate dihydrate, where a third one of the three phases features one or more regions formed of anhydrous calcium hydrogen phosphate, and where at least some of the regions corresponding to the first, second, and third phases contact one another in the one or more integral units of the solid.

Embodiments of the compositions can include any one or more of the following features.

A concentration percentage of the hydroxyapatite in the composition can be between 10% and 60% (e.g., between 20% and 50%). A concentration percentage of the calcium hydrogen phosphate dihydrate in the composition can be between 10% and 75% (e.g., between 20% and 60%). A concentration percentage of the anhydrous calcium hydrogen phosphate can be between 5% and 70% (e.g., between 10% and 60%).

A crystallinity of the material can be at least 90% (e.g., at least 95%). A specific surface area of the material can be at least 50 m$^2$/g (e.g., at least 70 m$^2$/g). A specific porosity of the material can be at least 25 cm$^3$/g (e.g., at least 30 cm$^3$/g).

The one or more integral units can include particles, where an average maximum dimension of the particles can be between 100 nm and 500 nm, and where an average aspect ratio of the particles can be 50:1 or more. The average aspect ratio of the particles can be 100:1 or more.

Embodiments of the compositions can also include any of the other features disclosed herein, including features disclosed in connection with different embodiments, in any combination except as specifically stated.

In another aspect, the disclosure features compositions that include a material featuring two calcium phosphate phases that form one or more integral units of a solid, where a first one of the two phases includes one or more regions formed of hydroxyapatite, where a second one of the three phases includes one or more regions formed of β-tricalcium phosphate, and where at least some of the regions corresponding to the first and second phases contact one another in the one or more integral units of the solid.

Embodiments of the compositions can include any one or more of the following features.

A concentration percentage of the hydroxyapatite in the composition can be between 8% and 95% (e.g., between 20% and 80%). A concentration percentage of the β-tricalcium phosphate in the composition can be between 5% and 92% (e.g., between 20% and 80%).

A crystallinity of the material can be at least 90% (e.g., at least 95%). A specific surface area of the material can be at least 50 m$^2$/g (e.g., at least 70 m$^2$/g). A specific porosity of the material can be at least 25 cm$^3$/g (e.g., at least 30 cm$^3$/g).

The one or more integral units can include particles, where an average maximum dimension of the particles can be between 100 nm and 500 nm, and where an average aspect ratio of the particles can be 50:1 or more. The average aspect ratio of the particles can be 100:1 or more.

Embodiments of the compositions can also include any of the other features disclosed herein, including features disclosed in connection with different embodiments, in any combination except as specifically stated.

In a further aspect, the disclosure features compositions that include a plurality of particles formed of hydroxyapatite, where an average maximum dimension of the particles is between 100 nm and 500 nm, an average aspect ratio of the particles is 50:1 or more, and a specific surface area of the particles is 70 m$^2$/g or more.

Embodiments of the compositions can include any one or more of the following features.

The average maximum dimension of the particles can be between 150 nm and 400 nm (e.g., between 200 nm and 400 nm, between 200 nm and 350 nm). The average aspect ratio of the particles can be 75:1 or more (e.g., 100:1 or more, 150:1 or more, 200:1 or more).

The specific surface area of the particles can be 75 m$^2$/g or more (e.g., 80 m$^2$/g or more, 85 m$^2$/g or more). A crystallinity of the particles can be 85% or more (e.g., 90% or more, 95% or more).

Embodiments of the compositions can also include any of the other features disclosed herein, including features disclosed in connection with different embodiments, in any combination except as specifically stated.

Definitions

As used herein, the terms "about" and "approximately" are used interchangeably, and when used to modify a numerical value, encompass a range of ±10% of the numerical value.

As used herein, the term "morphology" refers to the structure or distribution of atoms in a chemical compound. For example, morphology can refer to the crystal structure or the microstructure of a material, the spatial distribution of different compositional phases within a material, and/or other variations in structure within a material.

As used herein, the term "calcium oxide" refers to a compound having the nominal chemical formula CaO. The term "calcium oxide" refers to solid CaO, to solvated CaO (i.e., CaO dissolved in a solvent such as water), and to particles that include CaO and are suspended or otherwise dispersed in a fluid. In some embodiments, a calcium oxide, as discussed herein, can be a reactive calcium oxide (and may be referred to herein as a "reactive calcium oxide").

As used herein, the term "calcium hydroxide" refers to a compound having the nominal chemical formula Ca(OH)$_2$. The term "calcium hydroxide" refers to solid Ca(OH)$_2$, to solvated Ca(OH)$_2$ (i.e., Ca(OH)$_2$ dissolved in a solvent such as water), and to particles that include Ca(OH)$_2$ and are suspended or otherwise dispersed in a fluid.

As used herein, the term "calcium phosphate composition" refers to a composition that includes one or more calcium phosphate compounds.

As used herein, the terms "calcium phosphate," "calcium phosphate compound," and "calcium phosphate material" refer to a substance with a chemical formula that includes at least one calcium (II) ion and one or more of an orthophosphate ion, a metaphosphate ion, and a pyrophosphate ion. Some or all of these ions can also be present in combination within calcium phosphates, calcium phosphate compounds, and calcium phosphate materials.

As used herein, the term "orthophosphate ion" refers to a PO$_3^{3-}$ anion of the following chemical structure:

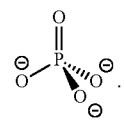

As used herein, the term "metaphosphate ion" refers to a P$_3$O$_9^-$ anion of the following chemical structure:

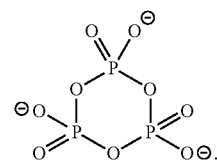 [SMILES: O=P1([O-])OP(=O)([O-])OP(=O)([O-])O1]

As used herein, the term "pyrophosphate ion" refers to a $P_2O_7^{4-}$ anion of the following chemical structure:

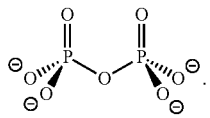

As used herein, the term "amorphous calcium phosphate (ACP)" refers to calcium phosphate compound having the chemical formula $Ca_3(PO_4)_2 \cdot nH_2O$, and characterized by a substantial lack of periodicity in the distribution of atoms or ions within the compound. The Ca:P ratio in ACP is 1.5:1.

As used herein, the term "β-tricalcium phosphate (β-TCP)" refers to a calcium phosphate compound having the chemical formula $Ca_3(PO_4)_2$. In some embodiments, β-TCP compounds have a rhombohedral crystal structure. The Ca:P ratio in β-TCP is 1.5:1.

As used herein, the term "β-tricalcium phosphate monohydrate (β-TCPM)" refers to a calcium phosphate compound having the chemical formula $Ca_3(PO_4)_2 \cdot H_2O$, for which the Ca:P ratio is 1.5:1.

As used herein, the term "hydroxyapatite (HA)" refers to calcium phosphate compound having the chemical formula $Ca_{10}(PO_4)_6(OH)_2$. In some embodiments, hydroxyapatite compounds have a hexagonal crystal structure. The Ca:P ratio in HA is 1.67:1.

As used herein, the term "tetracalcium phosphate" refers to a calcium phosphate compound having the chemical formula $Ca_4O(PO_4)_2$, for which the Ca:P ratio is 2:1.

As used herein, the term "α-tricalcium phosphate (α-TCP)" refers to a calcium phosphate compound having the chemical formula $Ca_3(PO_4)_2$. The Ca:P ratio in α-TCP is 1.5:1.

As used herein, the term "α'-tricalcium phosphate (α'-TCP)" refers to a calcium phosphate compound having the chemical formula $Ca_3(PO_4)_2$. The Ca:P ratio in α'-TCP is 1.5:1.

As used herein, the term "γ-tricalcium phosphate (γ-TCP)" refers to a calcium phosphate compound having the chemical formula $Ca_3(PO_4)_2$. The Ca:P ratio in γ-TCP is 1.5:1.

As used herein, the term "octacalcium phosphate (OCP)" refers to a calcium phosphate compound having the chemical formula $Ca_8H_2(PO_4)_6 \cdot 5H_2O$, for which the Ca:P ratio is 1.33:1.

As used herein, the term "calcium hydrogen phosphate dihydrate (DCPD)" refers to a calcium phosphate compound having the chemical formula $CaHPO_4 \cdot 2H_2O$, for which the Ca:P ratio is 1:1.

As used herein, the terms "calcium hydrogen phosphate", "monetite", and "anhydrous calcium hydrogen phosphate (DCPA)" refer to a calcium phosphate compound having the chemical formula $CaHPO_4$, for which the Ca:P ratio is 1:1.

As used herein, the term "calcium pyrophosphate (CPP)" refers to a calcium phosphate compound having the chemical formula $Ca_2P_2O_7$, for which the Ca:P ratio is 1:1.

As used herein, the term "calcium pyrophosphate dihydrate (CPPD)" refers to a calcium phosphate compound having the chemical formula $Ca_2P_2O_7 \cdot 2H_2O$, for which the Ca:P ratio is 1:1.

As used herein, the term "heptacalcium phosphate (HCP)" refers to a calcium phosphate compound having the chemical formula $Ca_7(P_5O_{16})_2$, for which the Ca:P ratio is 0.7:1.

As used herein, the term "tetracalcium dihydrogen phosphate (TDHP)" refers to a calcium phosphate compound having the chemical formula $Ca_4H_2P_6O_{20}$, for which the Ca:P ratio is 0.67:1.

As used herein, the term "calcium dihydrogen phosphate monohydrate" refers to a calcium phosphate compound having the chemical formula $Ca(H_2PO_4) \cdot H_2O$, for which the Ca:P ratio is 0.5:1.

As used herein, the terms "α-calcium metaphosphate (α-CMP)", "β-calcium metaphosphate (β-CMP)", and "γ-calcium metaphosphate (γ-CMP)" refer to different calcium phosphate compounds, each having the same chemical formula $Ca(PO_3)_2$, for which the Ca:P ratio is 0.5:1.

The calcium phosphate compositions disclosed herein can include one or more phases. As used herein, the term "phase" refers to a calcium phosphate compound within the calcium phosphate composition. In some embodiments, different phases within a composition are distributed in different spatial regions of the composition, so that the composition features distinct spatial regions corresponding to individual calcium phosphate compounds. The different spatial regions can be separated, in contact with another, and otherwise distributed in a variety ways, but generally form one or more integral units (such as particles) of a solid. For example, phases within a calcium phosphate composition can form separate domains within the composition. In certain embodiments, the domains can be of different sizes and have other properties that differ in addition to chemical composition (e.g., the domains can differ in crystallinity, melting point, surface structure, specific surface area, and other physical properties). The term "monophasic" refers to a composition with only a single phase therein; "biphasic" and "triphasic" refer to compositions with two and three phases, respectively. "Multiphasic" refers to compositions with two or more phases. In all compositions with two or more phases, the composition can include multiple domains corresponding to each phase. For example, a composition with multiple regions corresponding to a first phase (i.e., a first calcium phosphate compound) and multiple regions corresponding to a second phase (i.e., a second calcium phosphate compound), and no other calcium phosphate compounds, would be a biphasic composition.

As used herein, the term "crystallinity" of a material is the portion of the material that is in a crystalline state, i.e., having some long range ordering at the atomic level. The crystallinity of a material can be measured from the material's powder x-ray diffraction peaks by comparing the peak widths to standard peak widths and using Rietveld refinement to quantify the crystallinity of the material. The crystallinity is a number between 0% and 100%.

As used herein, the term "specific surface area" of a material is the total surface area of the material per unit of mass. The specific surface area can be determined by measuring nitrogen adsorption on the surface area of the material using the Brunauer-Emmett-Teller (BET) method.

As used herein, the term "specific porosity" or "specific pore volume" (used interchangeably to mean the same thing) of a material is the volume of the material per unit of mass that corresponds to pores, channels, and other voids in the material structure. A material's specific porosity can be determined using the BET method and/or Barrett-Joyner-Halenda (BJH) pore volume analysis.

As used herein, the term "reacting" refers to the bringing together of chemical reagents in such a manner to allow their interaction at the molecular level to achieve a chemical or physical transformation. Reacting can involve two reagents, where one or more equivalents of second reagent are used with respect to the first reagent. Reacting can also involve more than two reagents.

In this disclosure, materials such as calcium carbonate, calcium oxide, and calcium phosphate compositions are referenced in various preparative steps as being heated to a specific temperature or to a temperature within a specific range. In general, heating a material to a particular temperature involves setting an internal temperature of an oven, furnace, or other heating device to the particular temperature. The material that is heated within the oven, furnace, or other heating device may be heated uniformly (i.e., through the entire thickness of the material) to the particular temperature, or a thermal gradient may exist within the material such that, for example, at least a portion of an outer surface of the material is heated to within ±10% of the particular temperature, while interior regions of the material may be heated to temperatures less than the particular temperature. It should be understood that for purposes of this disclosure, heating a material to a particular temperature means that at least a portion of the material (i.e., at least a region of an outer surface of the material) is heated to within ±10% of the particular temperature, but does not necessarily mean that the entire material is heated to the specified temperature, nor that the entire material is heated to a uniform, gradient-free temperature.

Unless otherwise defined, all technical and scientific terms used herein have the same meaning as commonly understood by one of ordinary skill in the art to which this disclosure belongs. Although methods and materials similar or equivalent to those described herein can be used in the practice or testing of the subject matter herein, suitable methods and materials are described below. All publications, patent applications, patents, and other references mentioned herein are incorporated by reference in their entirety. In case of conflict, the present specification, including definitions, will control. In addition, the materials, methods, and examples are illustrative only and not intended to be limiting.

The details of one or more embodiments are set forth in the accompanying drawings and the description below. Other features and advantages will be apparent from the description, drawings, and claims.

DESCRIPTION OF DRAWINGS

Like reference symbols in the various drawings indicate like elements.

DETAILED DESCRIPTION

I. Introduction

Figure 1:
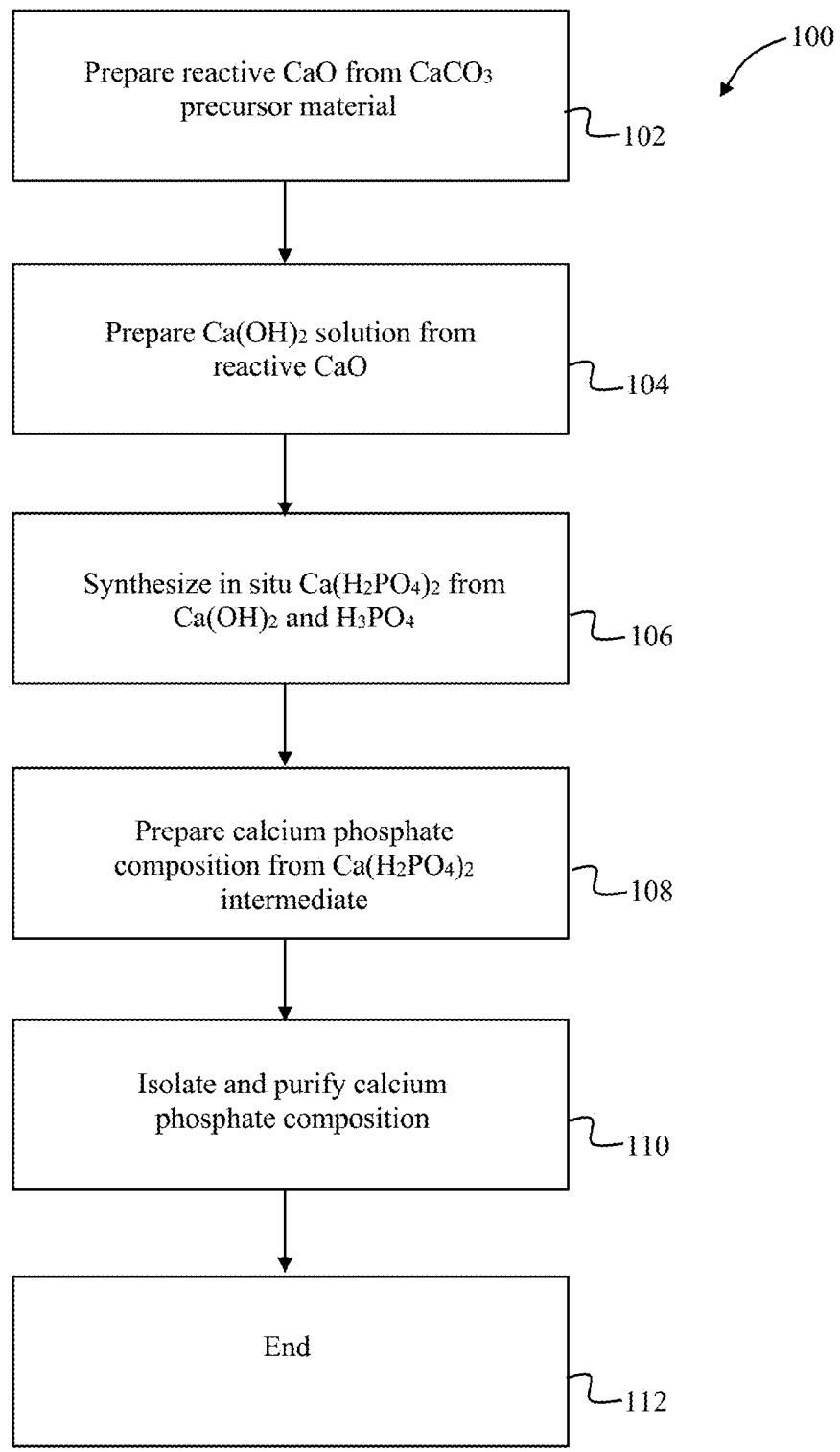
FIG. 1 is a schematic diagram of a series of steps for producing calcium phosphate compositions.

Calcium phosphates are widely used industrial compounds. In particular, monophasic calcium phosphates such as hydroxyapatite find application in dental and medical products, fertilizer production, food production and products, and industrial chemical production. However, the economic and environmental costs associated with producing monophasic chemical phosphate compounds have limited the uses of these compounds.

Biphasic and triphasic chemical phosphate compositions promise even greater utility, as the properties of such compositions can conceivably be tailored even more specifically for advantageous use in various applications. However, at present, industrial-scale methods for reproducible production of biphasic and triphasic chemical phosphate compositions with well controlled chemical and physical properties do not exist. This absence of viable large scale production routes leaves the promise of such compositions unfulfilled.

The present disclosure describes methods for controlled, reproducible, large scale production of chemical phosphate compositions. By adjusting the reagents and conditions involved, the chemical and physical properties of the compositions can be controlled in a systematic manner. This allows desired products to be prepared in large volumes on demand, at a cost that is significantly lower than conventional production methods. Moreover, the methods disclosed herein permit certain products for which no other large-scale production route exists—such as biphasic and triphasic calcium phosphate compositions within certain compositional ranges—to be produced.

In the following sections, a general overview of the productions methods is first discussed, followed by a discussion of individual stages of the methods. This disclosure also provides a large number of examples demonstrating controlled, on-demand fabrication of a wide variety of different calcium phosphate compositions with various combinations of chemical and physical properties.

II. General Overview

The methods disclosed herein produce calcium phosphate compositions in a two-stage reaction with aqueous calcium hydroxide solution. In turn, the aqueous calcium hydroxide solutions are prepared by dissolving a reactive calcium oxide product in water. Due to their reactivity, calcium oxides provide a synthetic route to calcium phosphates that is significantly less expensive than existing synthetic schemes at industrial-scale production volumes. In addition, the methods disclosed herein yield much larger quantities of calcium phosphate compositions, relative to conventional synthetic methods, in equivalent time periods.

The general methodology for the synthesis of calcium phosphate compositions is as follows. First, a reactive calcium oxide (CaO) precursor material is added to water to form a calcium hydroxide solution:

$$\text{reactive } CaO + H_2O \rightarrow Ca(OH)_2 \quad [1]$$

Then, a portion of the calcium hydroxide solution is combined with phosphoric acid to yield an intermediate calcium dihydrogen phosphate product in a solution or slurry:

$$Ca(OH)_2 + H_3PO_4 \rightarrow Ca(H_2PO_4)_2 \quad [2]$$

Finally, the calcium dihydrogen phosphate intermediate product is combined with another calcium hydroxide solution, prepared in the same manner as shown in Equation (1), to yield a calcium phosphate product:

$$Ca(H_2PO_4)_2 + Ca(OH)_2 \rightarrow Ca_3(PO_4)_2 \quad [3]$$

In Equation (3), the calcium phosphate product is shown with the nominal chemical formula $Ca_3(PO_4)_2$ for illustrative purposes. However, it should be understood that, depending upon the reaction conditions in Equations (1)-(3), the calcium phosphate compositions produced can include phosphate ions (i.e., orthophosphate ions), metaphosphate ions, and/or pyrophosphate ions, including mixtures of these anionic species. By adjusting the reaction conditions, control over the composition, structure, and physical properties of the calcium phosphate compositions produced can be achieved.

Further, it should be understood that while the methods discussed herein refer to $Ca(OH)_2$ solutions produced from a common reactive CaO precursor, $Ca(OH)_2$ solutions produced from different CaO precursor materials—including non-reactive CaO precursor materials—can also be used. The use of a reactive CaO precursor material ensures high yields and conversion rates, and reduced production times due to fast dissolution of the reactive CaO in water. However, CaO materials derived from production processes other than those disclosed herein (i.e., processes that do not yield reactive CaO) can also be used to prepare $Ca(OH)_2$ solutions that can be used to prepare calcium phosphate compositions according to Equations (2) and (3), and using the methods disclosed herein. Production of calcium phosphate compositions starting with non-reactive calcium oxide materials is therefore within the scope of this disclosure.

FIG. 1 is a flow chart 100 showing a series of general steps for the preparation of a variety of different calcium phosphate compositions. In a first step 102, reactive CaO is prepared from a precursor calcium carbonate ($CaCO_3$) material by heat treatment of the $CaCO_3$ particles. In step 104, a first quantity of the reactive CaO is dissolved in water to form an aqueous $Ca(OH)_2$ solution, which is then combined with a phosphate source such as phosphoric acid ($H_3PO_4$) in step 106 to form a slurry of aqueous $Ca(H_2PO_4)_2$. Then, in step 108, a second quantity of the reactive CaO is dissolved in water to form a second aqueous $Ca(OH)_2$ solution, which reacts with the aqueous $Ca(H_2PO_4)_2$ to form the calcium phosphate compositions. The process terminates at step 112.

Subsequent sections of this disclosure discuss the steps shown in FIG. 1 is greater detail, and the chemical and physical properties of calcium phosphate compositions prepared according to the procedure shown in FIG. 1.

III. Preparation of Reactive Calcium Oxide

The first step 102 of flow chart 100 includes the production of reactive calcium oxide from a calcium carbonate precursor material. In general, the production method involves the thermal decomposition of calcium carbonate to yield CaO and $CO_2$, as shown in Equation (1). Natural sources of calcium carbonate include materials such as limestone and seashells. In principle, calcium carbonate derived from any source can be thermally decomposed to yield reactive CaO. However, to ensure that the reactive CaO produced is low in impurities and has a relatively uniform size distribution, and to ensure high conversion rates with relatively low volume of byproducts produced, high quality limestone is typically used as the source of $CaCO_3$.

For a particle of limestone that is converted to CaO by thermal decomposition, the decomposition process begins on the surface of the particle and proceeds inwards toward the center of the particle as more heat is absorbed. At room temperature, solid limestone ($CaCO_3$) particles are stable. Upon heating to a suitable temperature, $CO_2$ is eliminated, leaving behind solid CaO particles. Because heating establishes a thermal gradient within the particle, at a particular time following the start of thermal decomposition, the particle will contain a limestone core surrounded by a calcined layer of CaO. The active elimination reaction occurs in the reaction zone, on the narrow border between the two regions.

Two processes occur during the reaction. Heat transfer to the $CaCO_3$ to the surface of the $CaCO_3$ particle occurs to raise the temperature of the $CaCO_3$ to initiate $CO_2$ dissociation. In the zone where dissociation of $CO_2$ is occurring, the temperature is approximately constant. As the reaction zone migrates deeper into the particle, subsequent quantities of heat penetrate the already-converted portions of the $CaCO_3$ particle (which now consist of CaO) to reach the reaction zone and maintain the elimination reaction.

Mass transfer also occurs within the $CaCO_3$ particle. $CO_2$ gas produced in the reaction zone diffuses from the interior of the particle to the exterior surface of the particle, through the newly formed CaO layer.

The temperature at which $CaCO_3$ dissociates to form CaO depends on the $CO_2$ pressure/concentration in the CaO layer in contact with the reaction zone. Because the reaction shown in Equation (1) is an equilibrium reaction, a large concentration or partial pressure of $CO_2$ in contact with the reaction zone will tend to favor the reactant (i.e., $CaCO_3$) in Equation (1), limiting the conversion rate and yield of CaO. In contrast, the lower the concentration/pressure of $CO_2$ in the CaO layer, the greater the extent to which the products (i.e., CaO) are favored in Equation (1). In turn, the greater the extent to which CaO is favored in Equation (1), the lower the temperature required to drive conversion of $CaCO_3$ into CaO.

In a typical limestone calcination furnace, the total gas pressure is approximately 1 atm, and $CO_2$ represents about 30% of the gas volume within the furnace. At this $CO_2$ concentration, the $CaCO_3$ at the exterior surface of a limestone particle will dissociate at a temperature of about 830° C.

In the interior of the particle, $CO_2$ dissociation from the reaction zone through the CaO layer to the exterior particle surface occurs only when the $CO_2$ pressure in the reaction zone exceeds the $CO_2$ partial pressure exterior to the particle in the furnace. By reducing $CO_2$ pressure/concentration within the furnace, the yield of CaO from Equation (1) can be increased and/or the temperature at which the reaction can be performed decreases. As mentioned above, where the partial pressure of $CO_2$ in the furnace is approximately 0.33 atm, $CaCO_3$ dissociation occurs at temperatures of approximately 830° C. and higher. When the partial pressure of $CO_2$ in the furnace is approximately 1 atm, $CaCO_3$ dissociation occurs at temperatures of approximately 902° C. and higher.

To initiate and maintain the reaction in Equation (1), heat is transmitted from the exterior of the particle to the interior through the enclosing CaO layer, which grows in thickness over time. For efficient heat transfer, a temperature gradient should exist between the exterior surface of the particle and the reaction zone. The magnitude of the gradient for efficient conversion to CaO depends on the particle size once the initial CaO layer is formed because CaO is a relatively poor heat conductor. In general, the larger the temperature difference between the exterior surface of the particle and the reaction zone, the faster the propagation of heat to the reaction zone.

However, when the surface CaO layer is heated, contraction of capillaries in the layer occurs as a by-product of crystal growth and re-growth, and crystal coalescence. Reduction of the porosity of the CaO layer hinders the diffusion of $CO_2$ out of the particle from the ever-deeper reaction zone. As $CO_2$ is prevented from diffusing out of the interior region of the particle, the partial pressure/concentration of $CO_2$ in the region of the particle adjacent to the reaction zone increases, which favors the reactant $CaCO_3$ in Equation (1), as discussed above. Thus, as $CO_2$ diffusion out of the interior of the particle is hindered, the temperature in the reaction zone may need to be increased to maintain conversion of $CaCO_3$ to CaO.

At very high temperatures (e.g., 1300-1400° C.), the surface CaO on particles undergoing thermal decomposition can sinter, leading to a significant reduction in the number and sizes of pores within the CaO layer. In turn, it becomes much more difficult for $CO_2$ generated in the reaction zone to diffuse through the CaO layer and out of the particle, which slows (or even stops) the rate of conversion of $CaCO_3$ to CaO. Sintering is a challenging problem to overcome when using limestone from sources with a wide variation in particle sizes. For example, when a distribution of $CaCO_3$ particles with sizes from 30 mm to 120 mm is used, to convert all of the $CaCO_3$ in the largest of the particles to CaO, temperatures of 1300-1400° C. are appropriate. At these temperatures, however, many of the smaller particles will sinter preventing complete conversion of these particles to CaO. Alternatively, at lower temperatures, sintering of the smaller $CaCO_3$ can be avoided, resulting in higher CaO conversion rates for these particles. But at lower temperatures, not all of the $CaCO_3$ in the larger particles is converted to CaO, as the thermal gradient in the particle interiors is not sufficient to drive the reaction in Equation (1) as the reaction zone migrates further toward the centers of the particles.

The loss of pore volume in both large and small $CaCO_3$ at high temperatures can also negative affect the reactivity of the CaO particles that are produced. CaO reactivity with a variety of reagents (including water) is strongly influenced by the presence of pores. In general, the larger the number and diameter of the pores in the CaO particles that are produced, the larger the surface area of the particles. Because chemical reactions occur on the surfaces of particles, the rates of many reactions depend on the effective surface area of the particles on which they occur. Particles with larger surface areas typically undergo faster reactions, all other conditions being equal, because the reactions occur at a larger number of sites per unit time.

Thus, when $CaCO_3$ particles are heated to temperatures that significantly reduce the pore volume, not only is it possible that the reduction in pore volume will attenuate the conversion of $CaCO_3$ to CaO, it is also possible that the reduction in pore volume will render the resulting CaO particles less reactive in subsequent processes such as dissolution in water.

Certain types of impurities that may be present in naturally-derived $CaCO_3$ particles (such as limestone particles, for example) may also become more troublesome at higher processing temperatures. For example, the reaction between certain impurities and CaO increases at higher temperatures. Thus, a certain percentage of the CaO product can be rendered unavailable due to reaction and formation of by-products with naturally occurring impurities in the reactant material. This reduces the overall conversion rate and results in a less "reactive" CaO product.

The foregoing considerations imply that to ensure a high conversion rate from $CaCO_3$ to CaO, and to produce a reactive CaO product, both the properties of the starting material ($CaCO_3$ particles) and the reaction conditions should be carefully controlled. In other words, it is the combination of these factors that produces a highly reactive product at a nearly 100% conversion rate.

With regard to particle size control, raw limestone chunks having a wide range of sizes are typically obtained and impact crushed to produce smaller particles. The smaller particles are then separated into a range of sizes using sequential sieves. This sorting process yields distributions of particles having a relatively narrow range of sizes. In general, the number of particle distributions depends on the number and configuration of sieves used to sort the particles after impact crushing. In some embodiments, for example, three different distributions of particles are obtained, each corresponding to a different mean particle size.

The distribution of particles that is processed via thermal decomposition typically has a carefully selected range of particle sizes. As discussed above, the particle sizes play an important role in the success of the conversion process. Particles that are too large may not be fully converted to CaO, leading to an impure product that still includes appreciate quantities of $CaCO_3$. Particles that are too small may also not be fully converted to CaO, as sintering may prevent efficient diffusion of $CO_2$ out of the interior of the particles. In addition, sintering may yield a CaO product with lower-than-expected reactivity on account of the reduction in pore volume that is a by-product of sintering.

In some embodiments, the mean size of the $CaCO_3$ particles used to produce CaO is about 6 mm. For a distribution of particles with a mean size of about 6 mm, the full width at half maximum (FWHM) of the particle size distribution is about 4 mm or less (e.g., about 3 mm or less, about 2 mm or less, about 1 mm or less). In certain embodiments, the mean size of the $CaCO_3$ particles used to produce CaO is about 10 mm. For a distribution of particles with a mean size of about 10 mm, the full width at half maximum (FWHM) of the particle size distribution is about 4 mm or less (e.g., about 3 mm or less, about 2 mm or less, about 1 mm or less). In some embodiments, the mean size of the $CaCO_3$ particles used to produce CaO is about 14 mm. For a distribution of particles with a mean size of about 14 mm, the full width at half maximum (FWHM) of the particle size distribution is about 4 mm or less (e.g., about 3 mm or less, about 2 mm or less, about 1 mm or less).

In some embodiments, the $CaCO_3$ particles used to produce CaO have a distribution of sizes between 4 mm and 8 mm. In certain embodiments, the particles have a distribution of sizes between 8 mm and 12 mm. In some embodiments, the particles have a distribution of sizes between 12 mm and 16 mm.

Another important consideration is the presence of impurities in the $CaCO_3$ reactant particles. As explained above, certain impurities in the $CaCO_3$ can react with the CaO product, forming products in which CaO is bound and no longer available for subsequent reactions. As one example, certain limestones have relatively high quartz (i.e., $SiO_2$) concentrations. Quartz reacts with CaO, yielding calcium silicate products, $2CaO.SiO_2$. In other words, each $SiO_2$ molecule reacts with two CaO molecules, yielding a relatively inert silicate product in which CaO is no longer available to react with most reagents, including water.

To avoid producing low reactivity CaO products in this manner, it has been found in general that the $CaCO_3$ particles used in Equation (1) to produce reactive CaO should have a chemical composition in which the concentration of $CaCO_3$ is at least 94%. To produce even higher reactivity CaO products, the concentration of $CaCO_3$ in the reagent particles is 95% or more (e.g., 97% or more, 98% or more, 99% or more, 99.5% or more, 99.9% or more).

To produce CaO particles from $CaCO_3$ particles, the $CaCO_3$ particles are heated to a relatively high temperature in a furnace. A variety of different furnaces can be used for this purpose, including but not limited to a horizontal rotary furnace, a vertical furnace, a natural draft furnace, a forced air furnace, a forced draft furnace, a condensing furnace, a one-stage or multi-stage furnace, a modulating furnace, a blast furnace, a puddling furnace, a reverberatory furnace, an open hearth furnace, and an induction furnace. The furnace can include one or more temperature measurement devices for measuring the internal furnace temperature during the conversion process. Examples of such devices include, but are not limited to, thermistors, thermocouples, resistance thermometers, and silicon bandgap temperature sensors.

To efficiently convert $CaCO_3$ particles to CaO particles, the $CaCO_3$ particles are heated to a relatively high temperature. In general, even heating of the $CaCO_3$ particles is important to avoid sintering and achieve a high conversion rate. As discussed above, heating the $CaCO_3$ particles to a temperature equal to or greater than a minimum temperature initiates the thermal decomposition of $CaCO_3$. In some embodiments, for example, the $CaCO_3$ particles are heated to a temperature greater than 900° C. (e.g., greater than 950° C., greater than 1000° C., greater than 1050° C., greater than 1100° C., greater than 1150° C.) to initiate thermal decomposition. In certain embodiments, the temperature is between 1000° C. and 1200° C. (e.g., between 1050° C. and 1200° C., between 1100° C. and 1200° C., between 1150° C. and 1200° C.).

To ensure that the porosity of the CaO particles is not reduced substantially, the temperature of the $CaCO_3$ particles can be maintained below a maximum temperature. For example, in certain embodiments, the temperature of the $CaCO_3$ particles throughout the thermal decomposition process is maintained below a temperature of 1200° C. (e.g., below 1150° C., below 1100° C., below 1050° C., below 1000° C.).

During thermal decomposition of the $CaCO_3$ particles, the temperature of the particles can be maintained between 900° C. and 1200° C. (e.g., between 950° C. and 1200° C., between 900° C. and 1150° C., between 950° C. and 1150° C., between 1000° C. and 1150° C., between 1000° C. and 1100° C., at about 1150° C.). By heating the $CaCO_3$ particles to temperatures at which thermal decomposition occurs and, at the same time, significant reductions in porosity are avoided, conversion of the particles to form reactive CaO particles occurs relatively rapidly. In some embodiments, for example, the $CaCO_3$ particles are heated for a period of 3.0 hours or less (e.g., 2.75 hours or less, 2.50 hours or less, 2.25 hours or less, 2.0 hours or less, 1.75 hours or less, 1.5 hours or less, 1.25 hours or less, 1.0 hours or less) to form the CaO particles. In certain embodiments, the $CaCO_3$ particles are heated for a period of at least 1.0 hour (e.g., at least 1.5 hours, at least 2.0 hours, at least 2.5 hours) to form the CaO particles. In some embodiments, the $CaCO_3$ particles are heated for a period of between 1.0 hour and 3.0 hours (e.g., between 1.5 hours and 3.0 hours, between 2.0 hours and 3.0 hours).

In some embodiments, the $CaCO_3$ particles are heated to a constant temperature to effect the conversion to CaO particles. However, as discussed above, as the CaO "shell" forms on the particles and the reaction zone migrates inward towards the particle centers, a larger thermal gradient may be needed to ensure that the temperature in the reaction zone reaches the minimum temperature for the decomposition reaction. Accordingly, in certain embodiments, heating occurs in two or more stages, where the temperature at each stage is higher than at the immediately preceding stage, and each stage occurs for a portion of the total heating period. For example, in a two-stage heating process, the $CaCO_3$ particles are first heated to a temperature in a range 900-1150° C. for a period of 5 mins. to 1 hour, and then heated to a temperature in a range 1150-1200° C. for a period of 5 mins. to 1 hour. As another example, in a three-stage heating process, the $CaCO_3$ particles are first heating to a temperature of between 900° C. and 1000° C., then heating to a temperature of between 1000° C. and 1100° C., and then to a temperature of between 1100° C. and 1200° C. Each stage can be performed for a period of between 5 mins. to 2 hours.

In general, multi-stage heating processes involving any number of steps, any temperature range from 900° C. to 1200° C. for each of the steps, and any time period between 5 minutes and three hours for each of the steps can be implemented. By using a multi-stage heating process, the thermal gradient within the $CaCO_3$ particles can be adjusted as the reaction zone migrates within the particles, which can allow a higher conversion rate and can shorten the overall conversion time.

In some embodiments, the heating process can be implemented as a continuous temperature increase from a lower temperature limit to an upper temperature limit. In general, lower and upper temperature limits from 900° C. to 1200° C. can be used for this purpose. For example, the temperature can be increased linearly between a first temperature in the range 900-1000° C., and a second temperature in the range 1100-1200° C., within the heating period.

Similar to step-wise increases in temperature, a continuous temperature increase can be used to match the temperature gradient within the $CaCO_3$ particles to the migration of the reaction zone. The temperature can vary (i.e., increase) linearly in some embodiments. However, a nonlinear temperature variation can also be used. In particular, for example, where the migration of the reaction zone is expected to occur nonlinearly in time through the $CaCO_3$ particles, the temperature can also increase nonlinearly in time.

In the foregoing methods, temperatures are established and maintained within the furnace based on measurements from the temperature measurement device. Such measurements allow particular temperatures to be achieved, and for the monitoring of temperatures within the furnace during the thermal decomposition process. The temperature measurements can be used as feedback signals to control furnace heating at any stage of the process.

Using the methods disclosed above, reactive CaO is produced from $CaCO_3$. A "reactive" CaO is one that reacts rapidly with water, leading to faster dissolution. Faster dissolution is important for production of calcium phosphate compositions on an industrial scale, as the aqueous $Ca(OH)_2$ solution that is produced is a key reagent in the production of the compositions.

The reactivity of the CaO produced as discussed above with water is a product of the CaO's surface area, porosity, particle size, and purity. The methods discussed above are designed to yield CaO products with favorable attributes in each respect, ensuring that they will be highly reactive. For example, using the methods disclosed above, the surface area of the CaO particles is at least 6.0 $m^2/g$ (e.g., at least 8.0 $m^2/g$, at least 10.0 $m^2/g$, at least 12.0 $m^2/g$, at least 14.0 $m^2/g$, at least 20.0 $m^2/g$).

The methods also yield CaO particles with relatively high porosity. For example, CaO particles produced as discussed above have specific porosity of at least 15.0 $cm^3/g$ (e.g., at least 20.0 $cm^3/g$, at least 25.0 $cm^3/g$, at least 30.0 $cm^3/g$, at least 35.0 $cm^3/g$, at least 40.0 $cm^3/g$, at least 50.0 $cm^3/g$).

CaO particles produced as discussed above have a relatively narrow distribution of sizes that matches the distribution of $CaCO_3$ particle sizes used to produce the CaO particles. In some embodiments, for example, the distribution of CaO particles has a mean particle size of 6 mm, and a FWHM of 4 mm or less (e.g., 3 mm or less, 2 mm or less, 1 mm or less). In certain embodiments, the distribution of CaO particles has a mean particle size of 10 mm, and a FWHM of 4 mm or less (e.g., 3 mm or less, 2 mm or less, 1 mm or less). In some embodiments, the distribution of CaO particles has a mean particle size of 14 mm, and a FWHM of 4 mm or less (e.g., 3 mm or less, 2 mm or less, 1 mm or less).

In some embodiments, the CaO particles that are produced have a distribution of sizes between 4 mm and 8 mm. In certain embodiments, the particles have a distribution of sizes between 8 mm and 12 mm. In some embodiments, the particles have a distribution of sizes between 12 mm and 16 mm.

By starting with relatively pure $CaCO_3$ particles and heating the particles to relatively high temperatures (which thermalizes certain impurities that may be present), high purity CaO particles can be produced. In some embodiments, for example, the CaO concentration in CaO particles produced as disclosed herein is 97% or more (e.g., 98% or more, 99% or more, 99.5% or more, 99.9% or more).

The concentration of residual $CaCO_3$ in the CaO is typically very low. For example, in some embodiments, the concentration of $CaCO_3$ in the CaO particles after heating as discussed above is 0.5% or less (e.g., 0.3% or less, 0.1% or less, 0.05% or less, 0.01% or less, 0.005% or less, 0.001% or less).

The overall efficiency of the conversion process is generally very high. The efficiency is defined as the percentage of $CaCO_3$ in the $CaCO_3$ particles that is converted to CaO in the product particles. Typically, the efficiency of conversion is 95% or greater (e.g., 97% or greater, 99% or greater, 99.5% or greater, 99.9% or greater, 99.99% or greater).

The reactivity of calcium oxide can be determined using the Wither method. The Wither method measures the ability of calcium oxide to undergo hydration. The reactivity of a CaO sample is determined by progressive reaction with water (to form calcium hydroxide) and neutralization of the resulting basic solution with 4N hydrochloric acid. Because the reaction with water takes place at the interface between the solid CaO particles and the aqueous solution, the specific surface area of the CaO particles has a significant effect on the reactivity index that is determined.

During the test, the alkaline $Ca(OH)_2$ that is formed upon reaction of CaO with water is neutralized with the hydrochloric acid, and the volume of hydrochloric acid used is recorded. The time elapsed since the initiation of the reaction is also recorded. More reactive CaO samples require a larger volume of hydrochloric acid for neutralization at earlier times, indicating that they react more rapidly with water.

Figure 2:
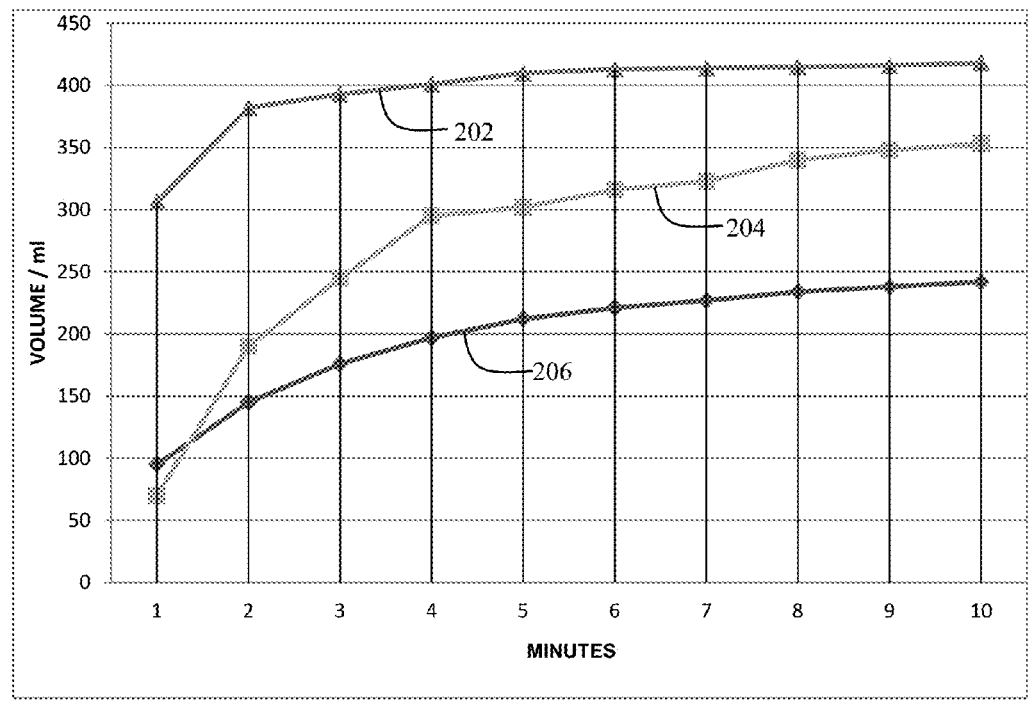
FIG. 2 is a plot showing volume of HCl solution neutralized as a function of time for a calcium hydroxide solution produced from reactive calcium oxide.

FIG. 2 is a graph showing Wither test results for 50 g of a reactive calcium oxide material produced as disclosed herein (curve 202), and for 50 g samples of two commercially available calcium oxide materials (curves 204 and 206). As shown in the graph, the reactivity of the reactive calcium oxide material was significantly higher than the reactivities of the commercially available calcium oxide materials. The maximum theoretical volume of 4N hydrochloric acid required to neutralize 50 g of pure CaO is about 446 mL. The reactive CaO shown in curve 202 required 418 mL, very close to the theoretical value.

IV. Production of Calcium Phosphate Compositions

Returning to FIG. 1, the next step 104 includes preparing an aqueous $Ca(OH)_2$ solution by dissolving the reactive CaO particles from step 102 in water. It should be noted that step 108 also involves the preparation of an aqueous $Ca(OH)_2$ solution from the reactive CaO particles prepared in step 102. The two $Ca(OH)_2$ solutions are typically prepared at the same time, with suitable quantities of reactive CaO dissolved in water to prepare each solution. Dissolving the reactive CaO particles in water yields a homogeneous solution at alkaline pH of fully solvated calcium ions. For this reason, while using reactive CaO to prepare the solutions has certain advantages in terms of faster production times, it should also be noted that $Ca(OH)_2$ solutions prepared from other CaO particles can also be used the preparation of calcium phosphate compositions as disclosed herein.

The concentrations of calcium ions ($Ca^{2+}$) in the two solutions can be the same or different. Where the concentrations differ, depending upon the nature of the calcium phosphate composition to be produced, the calcium ion concentration in the first $Ca(OH)_2$ solution can be greater than or less than the calcium ion concentration in the second $Ca(OH)_2$ solution.

In some embodiments, the concentration of calcium ions in the first solution is 1.0 mol/L or more (e.g., 1.25 mol/L or more, 1.5 mol/L or more, 1.75 mol/L or more, 2.0 mol/L or more, 2.5 mol/L or more, 3.0 mol/L or more). In certain embodiments, the concentration of calcium ions in the second solution is 1.0 mol/L or more (e.g., 1.25 mol/L or more, 1.5 mol/L or more, 1.75 mol/L or more, 2.0 mol/L or more, 2.5 mol/L or more, 3.0 mol/L or more).

Next, in step 106, an aqueous solution of phosphoric acid ($H_3PO_4$) is added to the first $Ca(OH)_2$ solution to eventually generate an aqueous slurry of $Ca(H_2PO_4)_2$. The generation of this compound as a stable intermediate species in solution is a key step in the overall synthetic method, as the $Ca(H_2PO_4)_2$ intermediate species acts as a common "baseline" compound from which a wide variety of final calcium phosphate compositions can be generated.

To generate the $Ca(H_2PO_4)_2$ intermediate product, the $H_3PO_4$ solution is added slowly with stirring to the first $Ca(OH)_2$ solution. Stirring can be implemented, for example, using two counter-rotating blades in the solution). It is important that the $H_3PO_4$ solution is not added too quickly, or amorphous $Ca_3(PO_4)_2$ will precipitate from solution. Once precipitated in this relatively inert form, the calcium and phosphate ions are no longer available to further steps in the synthetic method. In some embodiments, the concentration of phosphoric acid in the $H_3PO_4$ solution is 4.0 mol/L or more (e.g., 4.5 mol/L or more, 5.0 mol/L or more, 5.25 mol/L or more, 5.50 mol/L or more, 5.75 mol/L or more).

The requirement that the $H_3PO_4$ solution be added slowly arises from the multi-valent nature of the phosphate ion. In aqueous solution at different pH values, the phosphate ion can variously exist in its fully deprotonated form $PO_4^{3-}$, in its doubly deprotonated form $HPO_4^{2-}$, and in its singly deprotonated form $H_2PO_4^-$. When the pH of the solution changes slowly in a controlled fashion, each of these anionic forms of the phosphate ion can be generated. However, when the pH of the solution changes rapidly and counterions of a relatively insoluble phosphate salt are present in solution as a result of the pH change, precipitation of the salt tends to occur.

In effect, the various forms of the phosphate anion form a multi-stage buffer solution when pH changes are not too rapid. But when a large quantity of acid, for example, is added to the solution, the buffered nature of the solution is overcome and precipitation of a salt—where possible—tends to occur.

Slow addition of the $H_3PO_4$ solution with stirring ensures that the pH of the $Ca(OH)_2$ solution changes slowly, and that insoluble phosphate salts do not precipitate from solution. As the pH of the solution is slowly lowered, each of the intermediate phosphate ion species can be generated in a solution that is naturally buffered, until the intermediate dihydrogen phosphate product, $Ca(H_2PO_4)_2$, is generated as a slurry.

Figure 3:
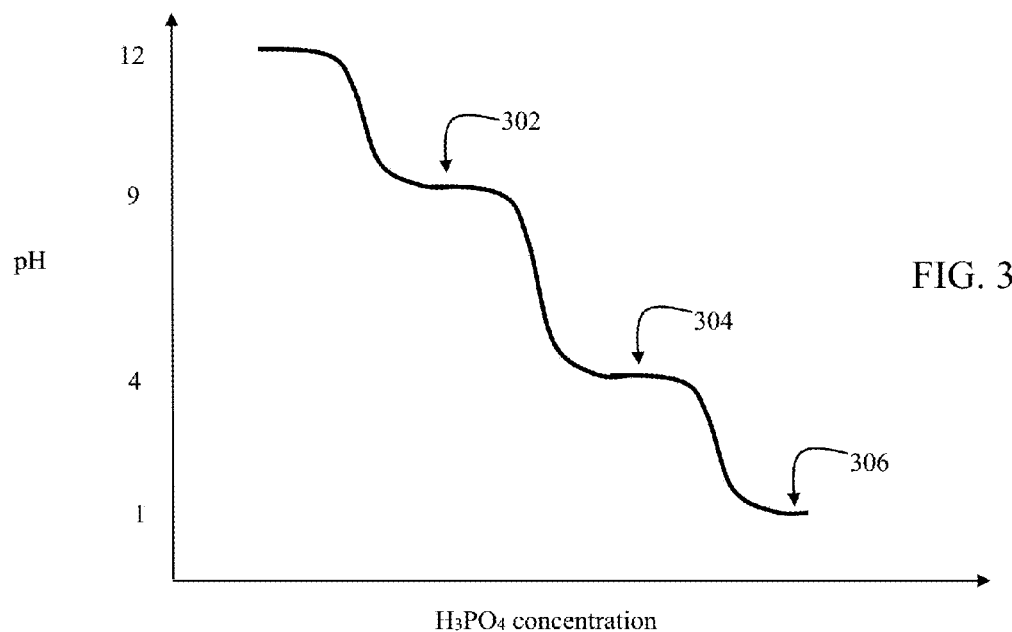
FIG. 3 is a plot showing pH as a function of $H_3PO_4$ concentration in an intermediate solution used to produce calcium phosphate compositions.

The manner in which the pH of the combined $Ca(OH)_2$ and $H_3PO_4$ solutions changes in shown schematically in the graph of FIG. 3. Initially, the first $Ca(OH)_2$ solution has a pH of about 12. The $H_3PO_4$ solution is added such that the pH of the combined solution is reduced in a series of stages. In the first stage, addition of the $H_3PO_4$ solution continues slowly, with stirring, until the solution pH reaches a value of between 8.5 and 9.5, as shown by the plateau region 302 in FIG. 3. The solution pH stabilizes at this value and is maintained by buffering between $PO_4^{3-}$ and $HPO_4^{2-}$ ions.

After the first stage pH has been reached and the solution pH has stabilized for at least 1 minute, addition of the $H_3PO_4$ solution recommences slowly with stirring in the second stage, until the solution pH reaches a value of between 3.5 and 4.5, represented by the plateau region 304 in FIG. 3. At this pH value, the solution pH stabilizes and is maintained by buffering between $HPO_4^{2-}$ and $H_2PO_4^-$ ions.

After the second stage pH has been reached and has stabilized for at least 1 minute, additional $H_3PO_4$ solution is added to the combined solution slowly, with stirring, until the pH of the combined solution reaches a value of between 1 and 2 (and in particular, between 1.4 and 1.7), represented by the plateau region 306 in FIG. 3. At this pH value, conversion of phosphate ions to $H_2PO_4^-$ ions has been optimized (or is approximately optimum), and the salt $Ca(H_2PO_4)_2$ precipitates weakly from solution, as it is mildly insoluble.

If stabilization of the solution pH at each of the three stages 302, 304, and 306 does not occur, for example because the $H_3PO_4$ solution was added too rapidly, then inert and amorphous $Ca_3(PO_4)_2$ will precipitate from solution as discussed above, which significantly reduces the overall yield of calcium phosphate compositions of interest that are produced. That is, when aqueous $H_3PO_4$ is added too quickly such that a large excess concentration of $PO_4^{3-}$ is instantaneously present in the solution, the result is rapid precipitation of relatively insoluble solid $Ca_3(PO_4)_2$.

In certain embodiments, to adjust the rate at which the pH of the solution changes as $H_3PO_4$ is added, the temperature of the $H_3PO_4$ solution can be controlled. For example, the temperature of the $H_3PO_4$ solution is between 0° C. and 40° C. (e.g., between 5° C. and 15° C., between 5° C. and 30° C., between 10° C. and 40° C., between 15° C. and 25° C., between 15° C. and 40° C., between 20° C. and 40° C., between 25° C. and 40° C., between 30° C. and 40° C.).

Next, in step 108, a calcium phosphate composition is prepared from the in situ $Ca(H_2PO_4)_2$ intermediate product. To prepare the calcium phosphate composition, the second $Ca(OH)_2$ solution is added slowly, with stirring, to the $Ca(H_2PO_4)_2$ slurry. Addition of the second $Ca(OH)_2$ solution increases the pH of the $Ca(H_2PO_4)_2$ slurry. As discussed above, the concentration of calcium ions in the second $Ca(OH)_2$ solution differs from the concentration of calcium ions in the first $Ca(OH)_2$ solution. The relative molar ratios of calcium and phosphate ions as well as the pH of the combined $Ca(H_2PO_4)_2$ slurry and second $Ca(OH)_2$ solutions controls the stoichiometry of the calcium phosphate composition that is produced, and also influences the physical properties of the composition.

In general, the molar ratio of calcium ions to dihydrogen phosphate ions in the slurry influences the number of phases and the chemical composition of the phases in the product calcium phosphate composition. In some embodiments, the molar ratio of the calcium dihydrogen phosphate ions to the calcium hydroxide ions is from about 0.25:1 to about 4:1 (e.g., from about 0.4:1 to about 1.17:1, from about 0.5:1 to about 1.1:1, about 1:1.7, about 1:1).

The final pH of the product solution, after all of the second $Ca(OH)_2$ solution has been added, depends upon the concentration and volume of the second $Ca(OH)_2$ solution. In some embodiments, the final pH is between 6.0 and 8.0 (e.g., between 6.5 and 7.5, about 7.0). In certain embodiments, the final pH is between 9.0 and 13.0 (e.g., between 10.0 and 13.0, between 11.0 and 13.0, between 11.5 and 12.5, about 12.0).

Addition of the second $Ca(OH)_2$ solution to the thick $Ca(H_2PO_4)_2$ slurry typically occurs slowly to avoid formation of a semi-solid mass. The final product calcium phosphate composition is obtained as an aqueous slurry, in a water:product ratio of about 12:1. In step 110, after the product calcium phosphate composition has been formed as a slurry, the slurry is isolated and purified. To isolate the product composition, the slurry can be heated in a rotary furnace to drive off of some of the water, yielding a reduced mixture with a water:product ratio of about 4:1. The reduced mixture can then be heated in a second furnace to drive off the remaining water, yielding the calcium phosphate composition in solid form. This two-stage isolation and purification process is typically used to avoid generating a solid calcium phosphate composition in the form of a hard block, which is difficult to process mechanically. Process water evaporated during both drying phases can be recovered and re-used upstream in the synthetic method to generate additional quantities of the first and second $Ca(OH)_2$ solutions.

To yield calcium phosphate products with desired particle sizes, the solid calcium phosphate composition can be mechanically ground into particles with a desired size distribution. Further treatment in a micronizer can be used to produce very small particles for use in specific applications. Calcium phosphate compositions with bimodal and other multimodal distributions of particle sizes can be produced by grinding and sieving different batches of the same product calcium phosphate composition to yield particles of different mean size and size distributions, and then combining the batches of to yield a calcium phosphate composition with a bimodal or other multimodal particle size distribution.

Even smaller particles (e.g., micrometer- and/or nanometer-sized particles) can be generated by subjecting the product to a thermal shock treatment. The thermal shock treatment can also be used to introduce and/or augment the distribution and sizes of pores in the product calcium phosphate composition. In this procedure, the temperature of the product composition is rapidly increased during the second stage of isolation and purification discussed above. As the temperature rises above the boiling point of the water trapped in the otherwise solid product composition, the water is converted to steam. As the steam escapes from the particles of the product composition, the internal structure of the particles is disrupted, creating pores and channels in the particles.

The thermal shock treatment can be performed as follows. An oven is heated to a temperature of about 500° C., and portions of the product—which are at temperatures of between 20-30° C.—are introduced slowly, so that the temperature within the oven remains above about 450° C. Each portion of the product is heated for about 15 minutes in the oven at 450-500° C. to effect thermal shock.

The increase in porosity of the product composition that results from thermal shock treatment depends significantly on the temperature to which particles of the product composition are heated. In some embodiments, product particles are heated to a temperature of 200° C. or more (e.g., 300° C. or more, 400° C. or more, 500° C. or more, 600° C. or more, 700° C. or more, 800° C. or more, 900° C. or more). The increase in temperature of the product particles during thermal shock treatment is typically at least 400° C. (e.g., at least 450° C., at least 500° C., at least 550° C., at least 600° C., at least 700° C.). The particles are typically heated for a duration of between 5 minutes and 30 minutes (e.g., between 5 minutes and 20 minutes, between 10 minutes and 30 minutes, between 10 minutes and 20 minutes, 30 minutes or less, 20 minutes or less, 15 minutes or less, 10 minutes or less).

After the calcium phosphate composition has been isolated and purified, the composition can be subjected to a further heat treatment to adjust the distribution of phases and/or the morphology of the product composition. In some embodiments, for example, the calcium phosphate composition that is produced can be heated at a temperature of from about 40° C. to about 1200° C. (e.g., from about 40° C. to about 1200° C., from about 75° C. to about 1200° C., from about 100° C. to about 1200° C., from about 150° C. to about 250° C., from about 150° C. to about 1200° C., from about 180° C. to about 220° C., from about 250° C. to about 1200° C., from about 350° C. to about 1200° C., from about 450° C. to about 1200° C., from about 550° C. to about 1200° C., from about 600° C. to about 1200° C., from about 650° C. to about 1200° C., from about 700° C. to about 1200° C., from about 750° C. to about 1200° C., from about 775° C. to about 1200° C., from about 800° C. to about 1200° C., from about 850° C. to about 950° C., from about 850° C. to about 1200° C., from about 900° C. to about 1200° C., from about 950° C. to about 1200° C., from about 1000° C. to about 1200° C., from about 1050° C. to about 1200° C., from about 1100° C. to about 1200° C.). Heating in any of the above temperature ranges can be performed for a time period from about 0.25 hours to about 5 hours (e.g., from about 1.5 hours to about 5 hours, from about 1 hour to about 3 hours, from about 1.5 hours to about 2.5 hours,).

V. Calcium Phosphate Compositions

A wide variety of calcium phosphate compositions can be produced using the synthetic methods disclosed herein, and by exercising suitable control over the various reaction conditions and reagents discussed above. In general, in addition to producing non-functionalized calcium phosphate product compositions, the methods disclosed herein can also be used to produce substituted calcium phosphate compositions featuring one or more substituents, including but not limited to halide groups and hydroxide groups. Suitable halides can include, for example, fluoride, chloride, bromide and iodide. Calcium phosphate compositions can generally include one or more halide substituents and/or one or more hydroxide substituents. It should be understood that the following discussion applies equally to substituted calcium phosphate compositions and unsubstituted calcium phosphate compositions unless expressly stated otherwise.

Examples of calcium phosphate compositions that can be produced using the methods disclosed herein include, but are not limited to, calcium dihydrogen phosphate, calcium hydrogen phosphate, tricalcium phosphate, hydroxyapatite, fluorapatite, chlorapatite, apatite, octacalcium phosphate, biphasic calcium phosphate, tetracalcium phosphate, $\beta$-tricalcium phosphate, and amorphous calcium phosphate. In some embodiments, the calcium phosphate compositions produced include one or more calcium phosphates selected from the group consisting of hydroxyapatite, $\beta$-tricalcium phosphate, and amorphous calcium phosphate.

In some embodiments, the calcium phosphate compositions produced have a molar percentage of amorphous calcium phosphate from 0% to 100% (e.g., from 0% to about 30%, from about 30% to about 70%, from about 70% to 100%, from about 45% to about 55%, from about 25% to about 35%). In certain embodiments, the calcium phosphate compositions consist entirely of amorphous calcium phosphate. In some embodiments, the calcium phosphate compositions produced have a molar percentage of $\beta$-tricalcium phosphate from 0% to 100% (e.g., from 0% to about 30%, from about 30% to about 70%, from about 70% to 100%, from about 5% to about 15%, from about 25% to about 35%, from about 30% to about 40%, from about 45% to about 55%). In certain embodiments, the calcium phosphate compositions consist entirely of $\beta$-tricalcium phosphate. In some embodiments, the calcium phosphate compositions produced have a molar percentage of hydroxyapatite from 0% to 100% (e.g., from 0% to about 30%, from about 30% to about 70%, from about 70% to 100%, from about 5% to about 15%, from about 10% to about 20%, from about 55% to about 65%, from about 85% to about 90%, from about 95% to 100%). In certain embodiments, the calcium phosphate compositions consist entirely of hydroxyapatite.

(1) Monophasic Calcium Phosphates

In some embodiments, the calcium phosphate composition produced according to the methods disclosed herein is a monophasic calcium phosphate composition (MpCP). The monophasic calcium phosphate composition can include a calcium phosphate compound selected from the group consisting of calcium dihydrogen phosphate, calcium hydrogen phosphate, tricalcium phosphate, hydroxyapatite, fluorapatite, chlorapatite, apatite, octacalcium phosphate, biphasic calcium phosphate, tetracalcium phosphate, β-tricalcium phosphate, and amorphous calcium phosphate.

(2) Biphasic Calcium Phosphates

In some embodiments, the calcium phosphate composition produced according to the methods disclosed herein is a biphasic calcium phosphate composition (BpCp). In some embodiments, the biphasic calcium phosphate composition includes two calcium phosphate compounds selected from the group consisting of calcium dihydrogen phosphate, calcium hydrogen phosphate, tricalcium phosphate, hydroxyapatite, fluorapatite, chlorapatite, apatite, octacalcium phosphate, biphasic calcium phosphate, tetracalcium phosphate, β-tricalcium phosphate, and amorphous calcium phosphate.

In some embodiments, the biphasic calcium phosphate composition includes hydroxyapatite and β-tricalcium phosphate. The molar ratio of hydroxyapatite to β-tricalcium phosphate can be from about 1:100 to about 50:50 (e.g., from about 10:90 to about 50:50, from about 20:80 to about 50:50, from about 30:70 to about 50:50, from about 40:60 to about 50:50). In some embodiments, the molar ratio of hydroxyapatite to β-tricalcium phosphate is from about 100:1 to about 50:50 (e.g., from about 90:10 to about 50:50, from about 80:20 to about 70:30, from about 60:40 to about 50:50, from about 80:20 to about 95:5, from about 55:45 to about 75:25, about 90:10, about 60:35).

In some embodiments, the biphasic calcium phosphate composition includes hydroxyapatite and amorphous calcium phosphate. The molar ratio of hydroxyapatite to amorphous calcium phosphate can be from about 1:100 to about 50:50 (e.g., from about 10:90 to about 50:50, from about 20:80 to about 50:50, from about 30:70 to about 50:50, from about 40:60 to about 50:50). In some embodiments, the molar ratio of hydroxyapatite to amorphous calcium phosphate is from about 100:1 to about 50:50 (e.g., from about 90:10 to about 50:50, from about 80:20 to about 70:30, from about 60:40 to about 50:50).

In some embodiments, the biphasic calcium phosphate composition includes β-tricalcium phosphate and amorphous calcium phosphate. The molar ratio of β-tricalcium phosphate to amorphous calcium phosphate can be from about 1:100 to about 50:50 (e.g., from about 10:90 to about 50:50, from about 20:80 to about 50:50, from about 30:70 to about 50:50, from about 40:60 to about 50:50). In some embodiments, the molar ratio of β-tricalcium phosphate to amorphous calcium phosphate is from about 100:1 to about 50:50 (e.g., from about 90:10 to about 50:50, from about 80:20 to about 70:30, from about 60:40 to about 50:50).

(3) Triphasic Calcium Phosphates

In some embodiments, the calcium phosphate composition produced according to the methods disclosed herein is a triphasic calcium phosphate composition (TpCP). In some embodiments, the triphasic calcium phosphate composition includes three calcium phosphate compounds selected from the group consisting of calcium dihydrogen phosphate, calcium hydrogen phosphate, tricalcium phosphate, hydroxyapatite, fluorapatite, chlorapatite, apatite, octacalcium phosphate, biphasic calcium phosphate, tetracalcium phosphate, β-tricalcium phosphate, and amorphous calcium phosphate.

In some embodiments, the triphasic calcium phosphate composition includes hydroxyapatite, β-tricalcium phosphate, and amorphous calcium phosphate in a molar ratio of about 10:35:55, about 10:40:50, about 20:30:50, about 20:35:45, about 15:30:55, about 15:40:45, about 15:35:50, about 5:65:30, about 5:60:35, about 15:55:30, about 15:60:25, about 10:55:35, about 10:65:25, or about 10:60:30.

In certain embodiments where the triphasic calcium phosphate composition includes hydroxyapatite, β-tricalcium phosphate, and amorphous calcium phosphate, the fraction of each of the compounds in the composition can be from 0% to about 95% (e.g., from 10% to about 80%, from 20% to about 70%, from 30% to about 60%, from 30% to about 90%, from 20% to about 90%, from 10% to about 90%, from 30% to about 70%, from 20% to about 70%, from 10% to about 70%, from 20% to about 50%, from 10% to about 50%).

(4) Physical Properties

In general, using the methods disclosed herein calcium phosphate compositions can be produced with a relatively wide range of specific surface areas. For example, the compositions can have specific surface areas from about 30 $m^2/g$ to about 90 $m^2/g$ (e.g., from about 40 $m^2/g$ to about 90 $m^2/g$, from about 50 $m^2/g$ to about 90 $m^2/g$, from about 60 $m^2/g$ to about 90 $m^2/g$, from about 70 $m^2/g$ to about 90 $m^2/g$, from about 80 $m^2/g$ to about 90 $m^2/g$. In some embodiments, the specific surface area of the compositions is 50 $m^2/g$ or more (e.g., 60 $m^2/g$ or more, 70 $m^2/g$ or more, 80 $m^2/g$ or more, 85 $m^2/g$ or more, 90 $m^2/g$ or more).

The average particle size (i.e., the average size of the maximum particle dimension) of the calcium phosphate composition that is produced, as measured using scanning electron microscopy, is from about 100 nm to about 50 μm (e.g., from about 500 nm to about 50 μm, from about 1 μm to about 50 μm, from about 5 μm to about 50 μm, from about from about 10 μm to about 50 μm, from about 15 μm to about 30 μm, from about 20 μm to about 30 μm, from about 20 μm to about 50 μm, from about 30 μm to about 50 μm, from about 40 μm to about 50 μm).

In certain embodiments, the specific porosity of the calcium phosphate compositions produced as disclosed herein is between about 0.1 $cm^3/g$ and about 0.25 $cm^3/g$ (e.g., between about 0.1 $cm^3/g$ and about 0.17 $cm^3/g$, between about 0.15 $cm^3/g$ and about 0.25 $cm^3/g$, between about 0.15 $cm^3/g$ and 0.17 $cm^3/g$, larger than about 0.15 $cm^3/g$).

The particles of the calcium phosphate compositions produced as disclosed herein have an aspect ratio defined as the ratio of the maximum overall particle dimension in any direction to the maximum particle dimension in any direction orthogonal to the maximum overall particle dimension. By adjusting the final pH of the product slurry in step 108 and heating of the calcium phosphate composition that is produced, particles with a wide variety of different aspect ratios can be produced. For example, in some embodiments, the mean aspect ratio of the calcium phosphate composition that is produced is 5:1 or more (e.g., 10:1 or more, 25:1 or more, 50:1 or more, 100:1 or more, 200:1 or more, 300:1 or more, 500:1 or more, 750:1 or more).

The molar ratio of calcium and dihydrogen phosphate ions, the final pH of the product slurry, and post-purification heating of the calcium phosphate composition produced also influences the crystallinity of the composition. In certain embodiments, for example, the crystallinity of the calcium phosphate composition is greater than 50% (e.g., greater than 60%, greater than 70%, greater than 80%, greater than 90%, greater than 95%, greater than 98%, greater than 99%).

EXAMPLES

The following specific examples are intended to further illustrate aspects of the methods and compositions disclosed herein, but are not intended to limit the scope of the disclosure in any manner.

The examples include measurements of various physical properties of calcium phosphate compositions that have been produced. To measure the physical properties, a variety of techniques and instruments were used. Analyses of the compositions was conducted using X-ray diffraction (XRD) to determine the ratio of phases in the composition prior to heat treatment and after the heat treatment. The compositions were analyzed on a Philips diffractometer with radiation Cu-Kα operated at 40 kW and 20 mA, with a scan rate of 0.06 degrees/sec. Calculations of the percentages of the calcium phosphates (e.g., hydroxyapatite, β-tricalcium phosphate, and amorphous calcium phosphate in BpCP and TpCP compositions) were performed based on the integration of the areas under the curves of the XRD spectra. Crystallinity measurements were also determined using XRD analysis.

Laser diffraction, scanning electron microscopy, and nitrogen pycnometry measurements were performed on compositions with nominal particle sizes between 38 μm and 53 μm, isolated using molecular sieves, to determine particle size distributions. Measurements of particle size distribution were also performed for certain compositions using a laser diffraction method in combination with a particle size analyzer (a CILAS 1064 instrument, available from CILAS, Orleans, France).

Analyses of particle morphology were also performed using scanning electron microscopy (SEM) (a JEOL 6300 scanning electron microscope, available from JEOL USA, Peabody, Mass.) operated at 25 kV. Chemical microanalysis was performed using energy dispersive X-ray analysis (EDXA) to measure the Ca/P ratio in the compositions, and to identify potential contaminants. The specific surface area of the calcium phosphates was determined by nitrogen adsorption in a Quantachrome Autosorb instrument (available from Quantachrome, Boynton Beach, Fla.).

Example 1. Preparation of Biphasic Calcium Phosphate Composition (90% Hydroxyapatite, 10% β-Tricalcium Phosphate)

Step 1: Preparation of a Calcium Hydroxide Mixture

Water (2 L) was cooled to a temperature of between about 20 to 26° C., then reactive calcium oxide (509.3 g, 9.08 mol, 95% purity, prepared as discussed herein) was added with stirring. After completion of the reaction, the resulting calcium hydroxide mixture was filtered through a 100 mesh (0.149 mm) filter and cooled to 22° C.

Step 2: Preparation of a Calcium Dihydrogen Phosphate Mixture

Phosphoric acid (29%, 2 L) was cooled to a temperature of 10° C. and added to a portion of the calcium hydroxide mixture of Step 1 at a rate of 30 g/min with stirring at 200 rotations per minute. The resulting calcium dihydrogen phosphate mixture had a pH of 3.

Step 3: Preparation of an Amorphous Calcium Phosphate

The calcium dihydrogen phosphate mixture was added to another portion of the calcium hydroxide mixture at a rate of 30 g/min with stirring at 200 rotations per minute, and the resulting reaction mixture had pH of 12. The reaction mixture was then dried at 200° C. to produce amorphous calcium phosphate. The aggregated particles were mechanically broken up, and the resulting particles sieved at 325 mesh (0.044 mm) for X-ray diffraction analysis.

Step 4: Preparation of a Biphasic Calcium Phosphate Composition (90% Hydroxyapatite, 10% β-Tricalcium Phosphate)

A fraction of the amorphous calcium phosphate was calcined at 900° C. for 4.0 hours to produce biphasic calcium phosphate (90% hydroxyapatite, 10% β-tricalcium phosphate), which was analyzed using X-ray diffraction.

Example 2. Preparation of Triphasic Calcium Phosphate (15% Hydroxyapatite, 35% β-Tricalcium Phosphate, 50% Amorphous Calcium Phosphate)

Step 1: Preparation of a Calcium Hydroxide Mixture

Water (2 L) was cooled to a temperature of between 20 to 26° C., then reactive calcium oxide (509.3 g, 9.08 mol, 95% purity, prepared according to procedures provided in U.S. Patent Application No. 62/232,999) was added with strong agitation. After completion of the reaction, the resulting calcium hydroxide mixture was filtered through a 100 mesh (0.149 mm) filter and cooled to 22° C.

Step 2: Preparation of a Calcium Dihydrogen Phosphate Mixture

Phosphoric acid (31.6%, 2 L) at a temperature of 22° C. was added to a portion of the calcium hydroxide mixture from Step 1, at a rate of 30 g/min with stirring at 200 rotations per minute. The resulting calcium dihydrogen phosphate mixture had a pH of 2.

Step 3: Preparation of a Triphasic Calcium Phosphate (15% Hydroxyapatite, 35% β-Tricalcium Phosphate, 50% Amorphous Calcium Phosphate)

The calcium dihydrogen phosphate mixture was added to another portion of the calcium hydroxide mixture at a rate of 30 g/min with stirring at 200 rotations per minute at a pH of 11. The products were dried at 200° C. to produce triphasic calcium phosphate (15% hydroxyapatite, 35% β-tricalcium phosphate, 50% amorphous calcium phosphate). The aggregated particles were mechanically broken up, and the resulting particles sieved at 325 mesh (0.044 mm) for X-ray diffraction analysis.

Example 3. Preparation of a Biphasic Calcium Phosphate (65% Hydroxyapatite, 35% β-Tricalcium Phosphate)

A fraction of the amorphous calcium phosphate (prepared according to the procedure of Example 2, Steps 1-3) was calcined at 900° C. for 4.0 hours to produce biphasic calcium phosphate (90% hydroxyapatite, 10% β-tricalcium phosphate), which was analyzed using x-ray diffraction.

Example 4. Preparation of Triphasic Calcium Phosphate (10% Hydroxyapatite, 60% β-Tricalcium Phosphate, 30% Amorphous Calcium Phosphate)

Step 1: Preparation of a Calcium Hydroxide Mixture

Water (4 L) was cooled to a temperature of between 40 to 60° C., then reactive calcium oxide (509.3 g, 9.08 mol, 95% purity, prepared according to procedures discussed herein) was added with strong agitation. After completion of the reaction, the resulting calcium hydroxide mixture was filtered through a 100 mesh (0.149 mm) filter and cooled to 22° C.

Step 2: Preparation of a Calcium Dihydrogen Phosphate Mixture

Phosphoric acid (34.0%, 3 L) at a temperature of 22° C. was added to a portion of the calcium hydroxide mixture from Step 1 at a rate of 30 g/min with stirring at 200 rotations per minute. The resulting calcium dihydrogen phosphate mixture had a pH of 1.

Step 3: Preparation of a Triphasic Calcium Phosphate (10% Hydroxyapatite, 60% β-Tricalcium Phosphate, 30% Amorphous Calcium Phosphate)

The calcium dihydrogen phosphate mixture from Step 2, was added to another portion of the calcium hydroxide mixture of Step 1, at a rate of 30 g/min with stirring at 200 rotations per minute, and the resulting reaction mixture had a pH of 10. The reaction mixture was then dried at 200° C. to produce triphasic calcium phosphate (10% hydroxyapatite, 60% β-tricalcium phosphate, 30% amorphous calcium phosphate). The aggregated particles were mechanically broken up, and the resulting particles sieved at 325 mesh (0.044 mm) for X-ray diffraction analysis.

Table 1 shows the properties of triphasic calcium phosphate (10% hydroxyapatite, 60% β-tricalcium phosphate, 30% amorphous calcium phosphate). The particle size distribution was measured by laser diffraction using the Fraunhofer method and scanning electron microscopy. The size of the smallest particle was calculated by the Scherrer method using X-ray diffraction. The aspect ratio was measured by scanning electron microscopy. The specific surface area, micropore and mesopore volumes, and average diameter of pores were determined by nitrogen pycnometry.

TABLE 1

Properties of Triphasic Calcium Phosphate (10% hydroxyapatite, 60% β-tricalcium phosphate, 30% amorphous calcium phosphate)

| Property | Value(s) | | |
|---|---|---|---|
| Particle size distribution (μm) | 3.54 ($10^{th}$ percentile) | 20.07 ($50^{th}$ percentile) | 53.11 ($90^{th}$ percentile) |
| Average particle diameter (μm, laser diffraction) | 24.89 | | |
| Particle size distribution (μm, SEM) | 5-45 | | |
| Size of smallest particle | 14 nm | | |
| Aspect ratio (SEM) | 1.5-2.5 | | |
| Specific surface area ($m^2/g$) | 75 ± 2 | | |
| Micro and mesopores volumes ($10^{-2}$ $cm^3/g$) | 16 ± 1 | | |
| Average diameter of pores (angstroms) | 18 ± 1 | | |
| Crystallinity Index | Approximately 25% | | |

Example 5. Alternative Preparation of a Hydroxyapatite Composition

Step 1: Preparation of a Calcium Hydroxide Mixture

Water (5 L) was cooled to a temperature of between 40 to 60° C., then reactive calcium oxide (436.7 g, 7.79 mol, 95% purity, prepared according to procedures provided in U.S. Patent Application No. 62/232,999) was added with strong agitation. After completion of the reaction, the resulting calcium hydroxide mixture was filtered through a 100 mesh (0.149 mm) filter and cooled to 22° C.

Step 2: Preparation of a Calcium Dihydrogen Phosphate Mixture

Phosphoric acid (30.5%, 5 L) at a temperature of 22° C. was added to the calcium hydroxide mixture at a rate of 30 g/min with stirring at 200 rotations per minute. The resulting calcium dihydrogen phosphate mixture had a pH of 1.

Step 3: Preparation of the Hydroxyapatite Composition

The calcium dihydrogen phosphate mixture of Step 2 was added to the first calcium hydroxide mixture of Step 1 at a rate of 30 g/min with stirring at 200 rotations per minute, and the resulting reaction mixture had a pH of 7. The reaction mixture was then dried at 200° C. The resulting aggregated particles were mechanically broken up, and the particles were sieved at 325 mesh (0.044 mm). The particles were then calcined at 950° C. for 4 hours to produce the hydroxyapatite composition, which was analyzed using X-ray diffraction.

Example 6. Amorphous Calcium Phosphate

Another sample of amorphous calcium phosphate was prepared as discussed above in connection with Example 1, and its properties were measured. Table 2 summarizes the results of the measurements. The particle size distribution was measured by laser diffraction using the Fraunhofer method and scanning electron microscopy. The size of the smallest particle was calculated by the Scherrer method using X-ray diffraction. The aspect ratio was measured by scanning electron microscopy. The specific surface area, micropore and mesopore volumes, and average diameter of pores were determined by nitrogen pycnometry.

TABLE 2

Properties of Amorphous Calcium Phosphate

| Property | Value(s) | | |
|---|---|---|---|
| Particle size distribution (μm) | 3.02 ($10^{th}$ percentile) | 12.76 ($50^{th}$ percentile) | 29.49 ($90^{th}$ percentile) |
| Average particle diameter (μm, laser diffraction) | 14.81 | | |
| Particle size distribution (μm, SEM) | 10-45 | | |
| Size of smallest particle | 14 nm | | |
| Aspect ratio (SEM) | 1.5-2.5 | | |
| Specific surface area ($m^2/g$) | 66 ± 2 | | |
| Micro and mesopores volumes ($10^{-2}$ $cm^3/g$) | 13 ± 1 | | |
| Average diameter of pores (angstroms) | 17 ± 1 | | |
| Crystallinity Index | Approximately 20% | | |

Figure 4:
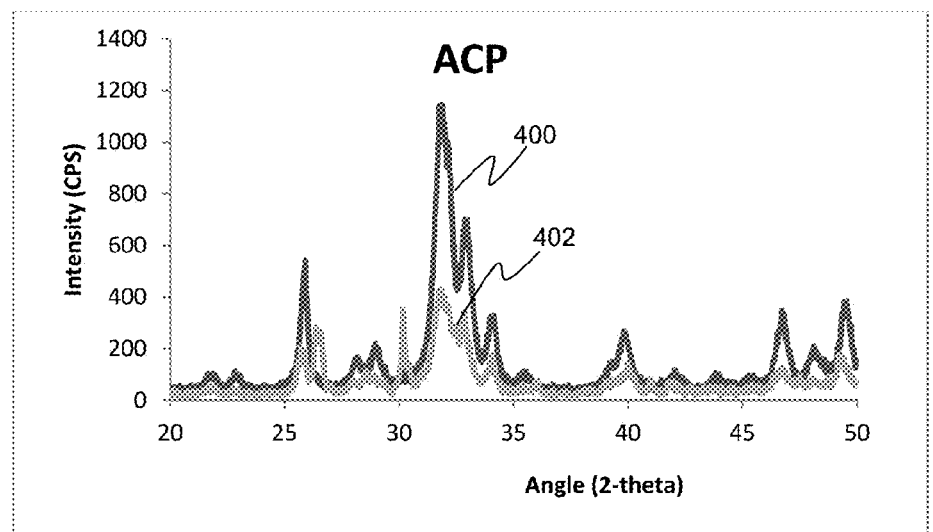
FIG. 4 is a plot showing scattered x-ray intensity as a function of angle for a calcium phosphate composition.

FIG. 4 is an X-ray diffractogram of a sample of amorphous calcium phosphate (curve 400) superimposed with an X-ray diffractogram of amorphous calcium phosphate after carbon dioxide saturation (curve 402) expressed as intensity (CPS) as a function of scattering angle (2θ). A significant difference is observed between the peak intensities in plots 400 and 402.

Figure 5A:
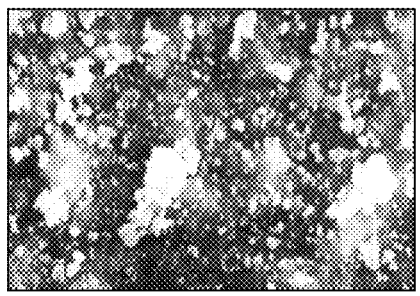
FIGS. 5A and 5B are scanning electron microscope images of a sample of amorphous calcium phosphate at two different magnifications.
Figure 5B:
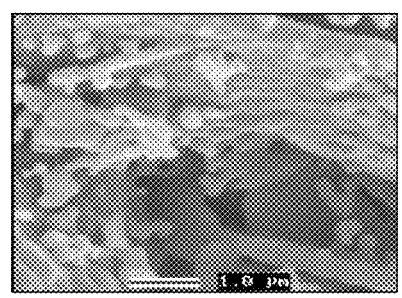

FIGS. 5A and 5B are SEM photomicrographs of amorphous calcium phosphate at a magnification factor of 500 and a magnification factor of 1500, respectively. The images show that the amorphous calcium phosphate consists of small, irregularly-shaped particles and plates forming agglomerates. Nanometric particles can also be observed, which are adhered to larger irregular particles forming clusters. These clusters, together with the observed porosity, are believed to contribute to the high surface area of the amorphous calcium phosphate.

Example 7. Triphasic Calcium Phosphate

A sample of triphasic calcium phosphate consisting of 10% hydroxyapatite, 60% β-tricalcium phosphate, and 30% amorphous calcium phosphate, was prepared using the methods discussed above in connection with Example 4, and its properties were measured. Table 3 summarizes the results. Particle size measurements and distribution were measured by laser diffraction (CILAS) and confirmed by SEM measurements. The size of the smallest particle was calculated by the Scherrer method using X-ray diffraction. The aspect ratio was measured by scanning electron microscopy. The specific surface area, micropore and mesopore volumes, and average diameter of pores were determined by nitrogen pycnometry.

TABLE 3

Properties of Triphasic Calcium Phosphate (10% Hydroxyapatite, 60% β-Tricalcium Phosphate, 30% Amorphous Calcium Phosphate)

| Property | Value(s) | | |
|---|---|---|---|
| Particle size distribution (μm) | 3.54 ($10^{th}$ percentile) | 20.07 ($50^{th}$ percentile) | 53.11 ($90^{th}$ percentile) |
| Average particle diameter (μm, laser diffraction) | 24.89 | | |
| Particle size distribution (μm, SEM) | 5-45 | | |
| Size of smallest particle | 14 nm | | |
| Aspect ratio (SEM) | 1.5-2.5 | | |
| Specific surface area (m$^2$/g) | 75 ± 2 | | |
| Micro and mesopores volumes ($10^{-2}$ cm$^3$/g) | 16 ± 1 | | |
| Average diameter of pores (angstroms) | 18 ± 1 | | |

Figure 6:
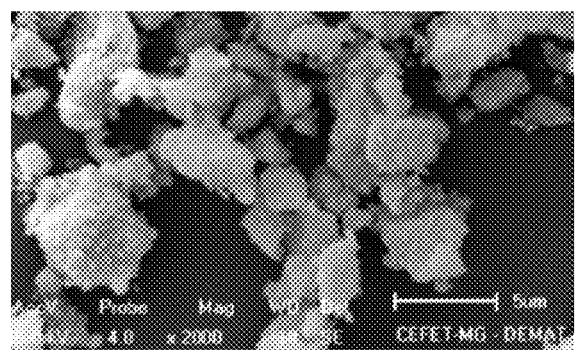
FIG. 6 is a scanning electron microscope image of a triphasic calcium phosphate composition.

The specific surface area, volume and average diameter of micro and mesopores reported in Table 3 were determined using the BET technique. These data show a significant difference specific surface area, volume, average diameter and distribution of pores between tri-phasic calcium phosphate and biphasic calcium phosphate. The surface area of the triphasic calcium phosphate was calculated using the BET equation. As the BET method with nitrogen does not uniformly provide an accurate estimate for the calculation of surface areas on materials that have isotherms of the type corresponding to this sample, these results confirm qualitatively that the particles had a large surface area. FIG. 6 is a photomicrograph produced using a scanning electron microscope, showing a portion of the triphasic calcium phosphate composition that was produced.

Example 8. Biphasic Calcium Phosphate

A sample of biphasic calcium phosphate consisting of 90% hydroxyapatite and 10% β-tricalcium phosphate was measured, with the measurement results summarized in Table 4.

TABLE 4

Properties of Biphasic Calcium Phosphate (90% Hydroxyapatite, 10% β-Tricalcium Phosphate)

| Property | Value(s) | | |
|---|---|---|---|
| Particle size distribution (μm) | 4.3 ($10^{th}$ percentile) | 17.7 ($50^{th}$ percentile) | 39.8 ($90^{th}$ percentile) |
| Average particle diameter (μm, laser diffraction) | 20.3 | | |
| Particle size distribution (μm, SEM) | 20-50 | | |
| Size of smallest particle | 16 nm | | |
| Aspect ratio (SEM) | 1.5-2.5 | | |
| Specific surface area (m$^2$/g) | 40 ± 2 | | |
| Micro and mesopores volumes ($10^{-2}$ cm$^3$/g) | 9 ± 1 | | |
| Average diameter of pores (angstroms) | 104 ± 4 | | |

The particle size distributions in Table 4 were determined from SEM images using the Scherrer formula, and from laser diffraction (CILAS) measurements. Comparison between the size distributions provided by the SEM and laser diffraction showed a significant difference between these two results possibly arising from particle clusters. One possible explanation is due to particle agglomeration due to zeta potential, e.g., the agglutination factor by surface electric charges and a probable measurement sizes of agglomerates rather than individual particles. The density of particles was measured by a nitrogen pycnometer and approached the theoretical density of hydroxyapatite (e.g., 3.2 g/cm$^3$), when the porosity is extremely low.

The specific surface area, volume and average diameter of micro- and mesopores were determined using the BET method. The surface area was calculated by the BET equation (an average of three samples being analyzed). It should be noted that the BET method with nitrogen does not uniformly provide an accurate estimate for the calculation of surface areas on all materials. Therefore, while these results verify that the particles had a large surface area, they are most useful when interpreted qualitatively.

Figure 7A:
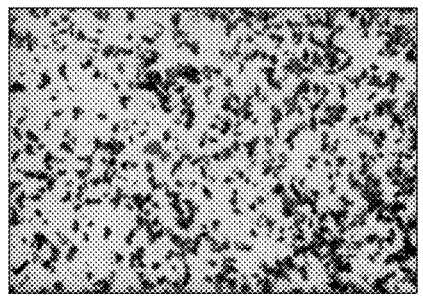
FIGS. 7A and 7B are scanning electron microscope images of a biphasic calcium phosphate composition at two different magnifications.
Figure 7B:
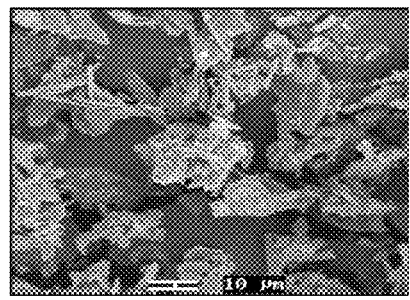

FIGS. 7A and 7B are SEM images of the biphasic calcium phosphate sample at magnifications of 50× (FIG. 7A) and 5000× (FIG. 7B). These micrographs demonstrate that the biphasic calcium phosphate powder includes particles and small plates forming clusters with irregular shapes. Nanoscale particles were observed adhering to larger particles which may increase the surface area of the particles. The distribution of sizes of the biphasic calcium phosphate composition particles obtained from screening between 38 μm and 53 μm was confirmed by measurements made by SEM.

Example 9. X-Ray Diffraction Measurements

Table 5 shows X-ray diffraction peak values, in units of θ, and associated intensities for calcium phosphate compositions prepared in Examples 1-5.

TABLE 5

X-Ray Diffraction Peak Values and Intensities

| Calcium Phosphate Composition | θ Values (with CPS intensity in parentheses) |
|---|---|
| Amorphous Calcium Phosphate (ACP) | 26.1 (292), 26.7 (179), 32 (204), 31.9 (570), 32.2 (583), 34.3 (184), 40.2 (140), 46.8 (155), 49.7 (191). |

TABLE 5-continued

X-Ray Diffraction Peak Values and Intensities

| Calcium Phosphate Composition | θ Values (with CPS intensity in parentheses) |
|---|---|
| Biphasic Calcium Phosphate (90% HA, 10% β-TCP; Example 1) | 21.9 (168), 22.9 (140), 25.5 (80), 25.9 (660), 28.2 (180), 29 (320), 31.9 (1820), 32.3 (1290), 33.0 (1146), 34.2 (475), 35.7 (60), 37.4 (1280), 39.3 (138), 39.8 (430), 40.5 (60), 42.1 (137), 43.9 (110), 45.3 (96), 46.8 (515), 48.2 (221), 48.7 (55), 49.6 (580). |
| Triphasic Calcium Phosphate (15% HA, 35% β-TCP, 50% ACP; Example 2) | 20.9 (142), 23.1 (88), 25.8 (165), 26.5 (373), 26.7 (368), 28.8 (212), 29.4 (487), 30.2 (233), 32.1 (360), 32.3 (331), 32.8 (300), 33.4 (178), 34.1 (509), 36.0 (120), 39.4 (122), 40.1 (148), 43.2 (120), 47.2 (255), 48.5 (182), 49.2 (150), 49.5 (151). |
| Biphasic Calcium Phosphate (65% HA, 35% β-TCP; Example 3) | 21.9 (130), 23.0 (140), 25.6 (78), 26.0 (558), 28.2 (180), 29.1 (260), 31.2 (50), 31.9 (1420), 32.3 (1030), 33.0 (860), 34.2 (400), 35.8 (92), 37.5 (1640), 39.3 (119), 40.0 (320), 40.7 (55), 42.2 (115), 44.0 (80), 45.5 (80), 46.8 (443), 48.2 (212), 48.8 (85), 49.7 (480). |
| Triphasic Calcium Phosphate (10% HA, 60% β-TCP, 30% ACP; Example 4) | 13.0 (190), 26.0 (1010), 28.7 (290), 30.1 (1190), 32.0 (288), 32.3 (465), 32.9 (594), 36.0 (209), 40.0 (230), 41.0 (200), 42.2 (190), 47.7 (212), 49.8 (307), 53.2 (317). |
| Hydroxyapatite Composition (Example 5) | 21.9 (190), 23.1 (150), 25.6 (90), 26.0 (630), 28.2 (210), 29.1 (420), 32.9 (2140), 32.3 (1320), 33.0 (1512), 34.2 (495), 35.7 (140), 37.5 (945), 39.3 (120), 39.9 (580), 40.6 (54), 42.1 (144), 43.9 (107), 44.4 (45), 45.4 (108), 46.8 (655), 48.2(303), 48.8 (109), 49.6 (618). |

Example 10. Synthesis of Hydroxyapatite-Containing Compositions

A series of calcium phosphate compositions designated CP14-CP28 were prepared using the methods disclosed herein. A solution of 250 kg of reactive CaO dissolved in 2500 L of deionized water was prepared, agitating for 20 minutes to complete dissolution, forming a $Ca(OH)_2$ solution. The solution was filtered using mesh sieves #100 (149 μm), #170 (88 μm), and #270 (53 μm). A 50% phosphoric acid solution was also prepared by dissolving 406 kg of solid phosphoric acid in 406 kg of deionized water. The phosphoric acid solution was added to the $Ca(OH)_2$ solution at a rate of 6.8 kg/min. with constant agitation over a total time period of 120 minutes. The final pH of the calcium dihydrogen phosphate slurry that formed was 1.66.

A second $Ca(OH)_2$ solution was prepared by dissolving 250 kg of reactive CaO in 3000 kg of deionized water over a period of 20 minutes with constant agitation. The second $Ca(OH)_2$ solution was filtered using sieves #100 (149 μm), #170 (88 μm), and #270 (53 μm).

The second $Ca(OH)_2$ solution was then added to the calcium dihydrogen phosphate slurry, with controlled agitation, at a rate of 17.4 kg/min. for 150 minutes. The final pH of the resulting slurry was 7.4. Agitation of the slurry was continued for an additional 30 minutes without addition of any further reagents until rheological equilibrium was achieved.

The samples were dried as discussed above. During drying, samples CP14-CP20 were subjected to thermal shock to adjust the porosity and specific surface area. Sample CP14 was sieved using a 325 mesh filter to yield a sample with a mean particle size of 44 microns. Samples CP17-CP19 were also sieved to yield samples with a distribution of particles within a range of 0.3 mm to 3.35 mm. Sample CP20 was subject to comminution to yield a sample with particle sizes between 2 mm and 4 mm. All samples were first dried in a gas oven at 200° C., and then in an electric oven at 300° C. for 6 hours. Samples CP15 and CP16 were then subjected to an additional heat treatment; CP15 was heated to a temperature of 500° C. for a time of 1 hour, while CP16 was heated to a temperature of 600° C. for a time of 1 hour.

Figure 8A:
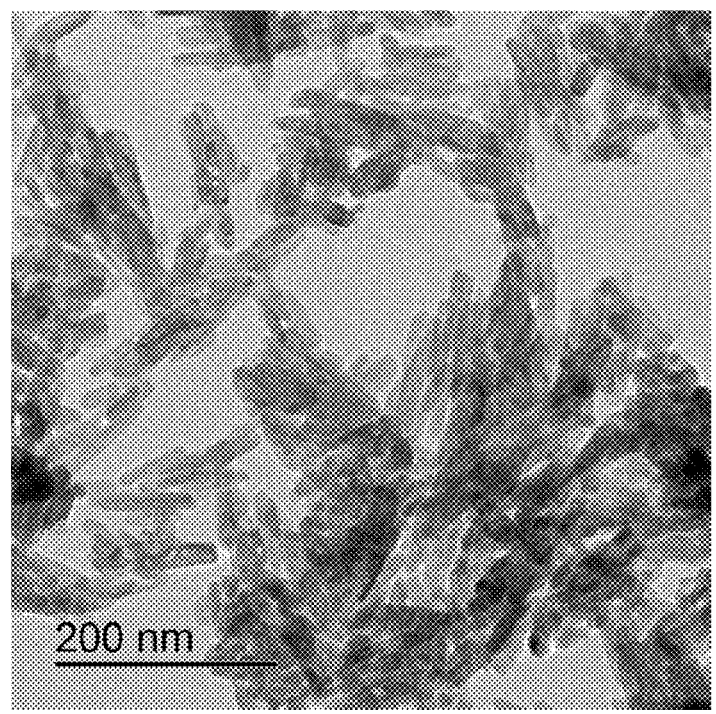
FIGS. 8A-8C are scanning electron microscope images of a calcium phosphate composition at different magnifications.
Figure 8B:
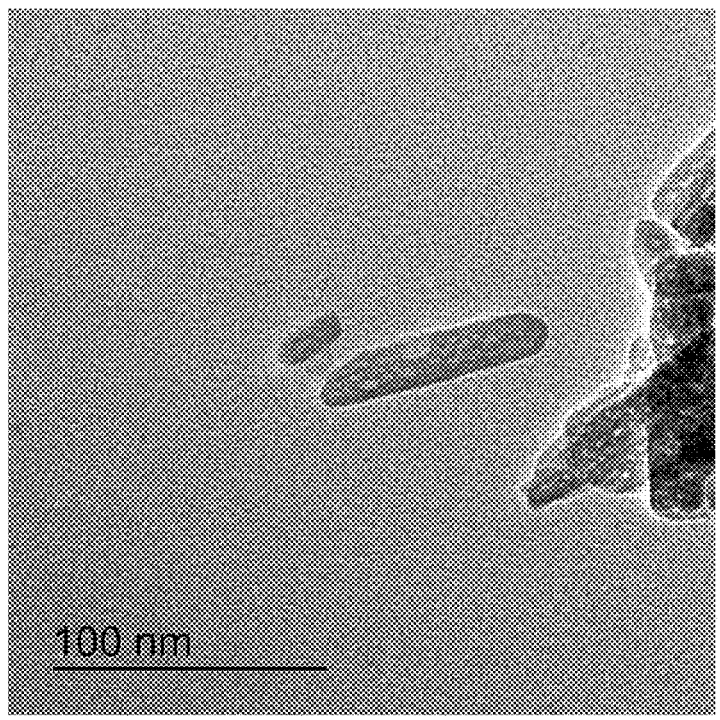
Figure 8C:
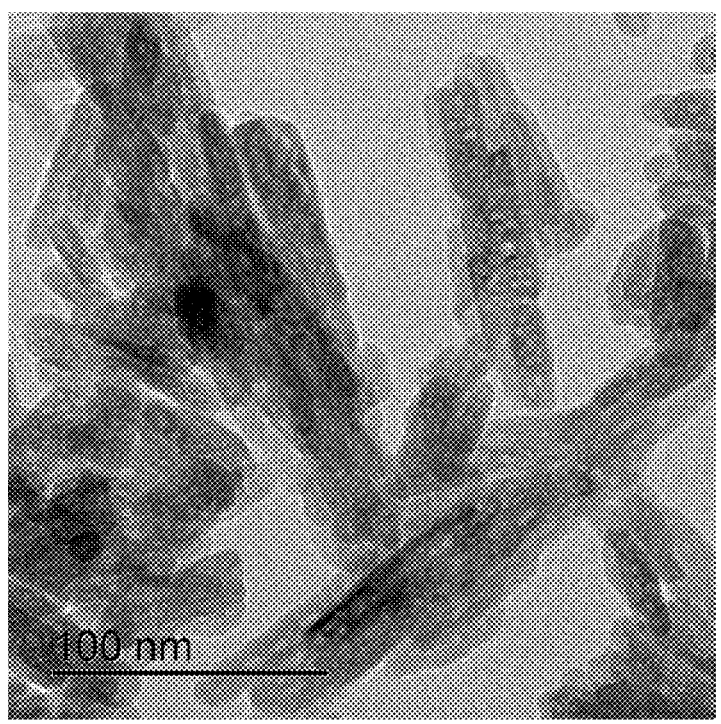
Figure 9A:
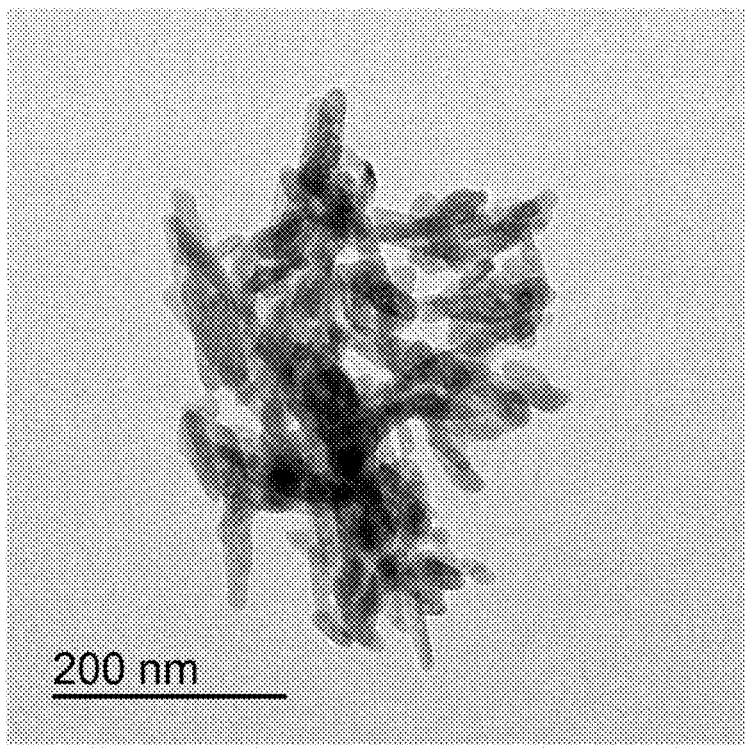
FIGS. 9A and 9B are scanning electron microscope images of another calcium phosphate composition at different magnifications.
Figure 9B:
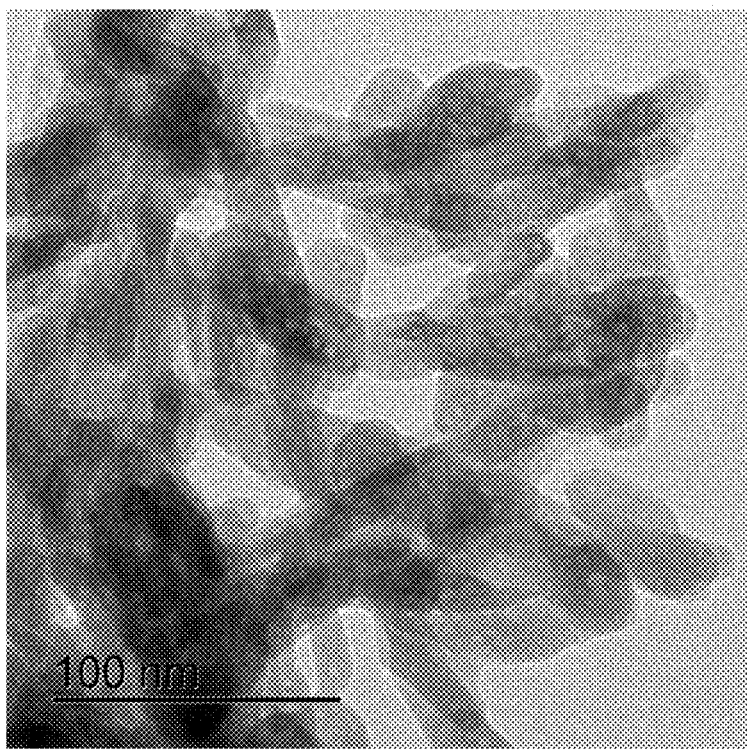
Figure 10A:
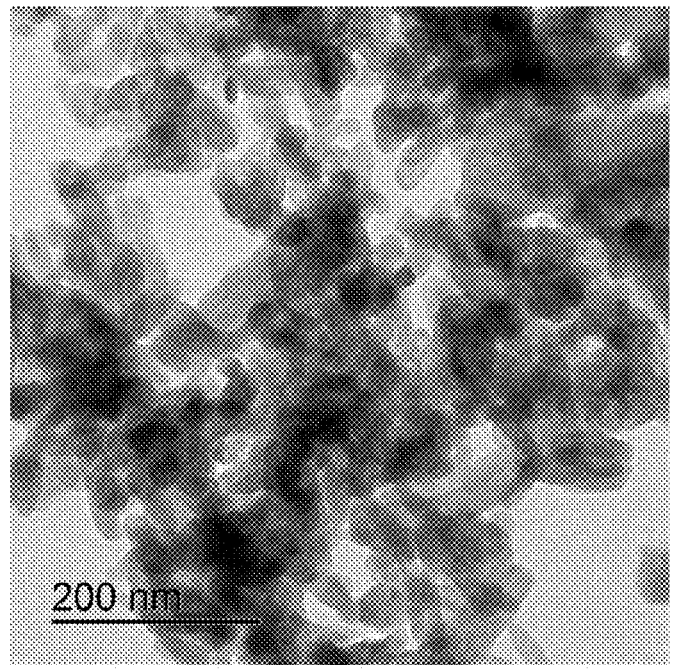
FIGS. 10A and 10B are scanning electron microscope images of a further calcium phosphate composition at different magnifications.
Figure 10B:
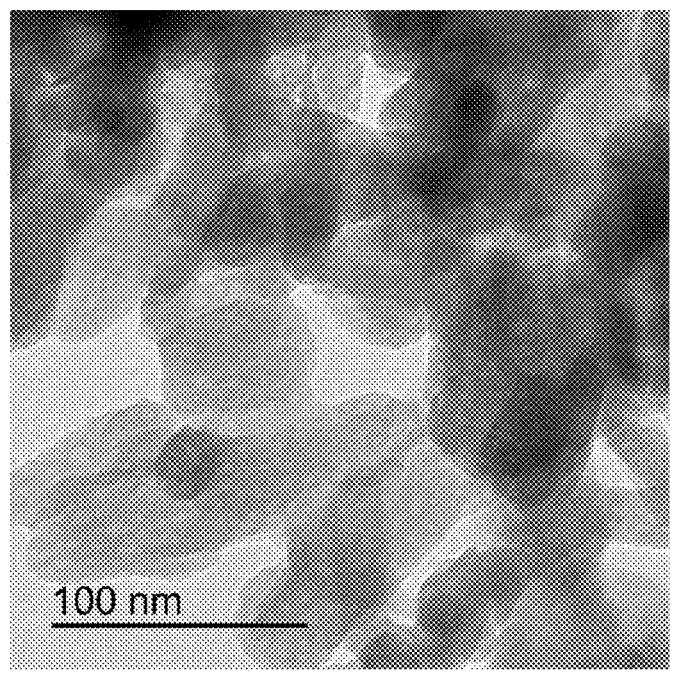
Figure 11:
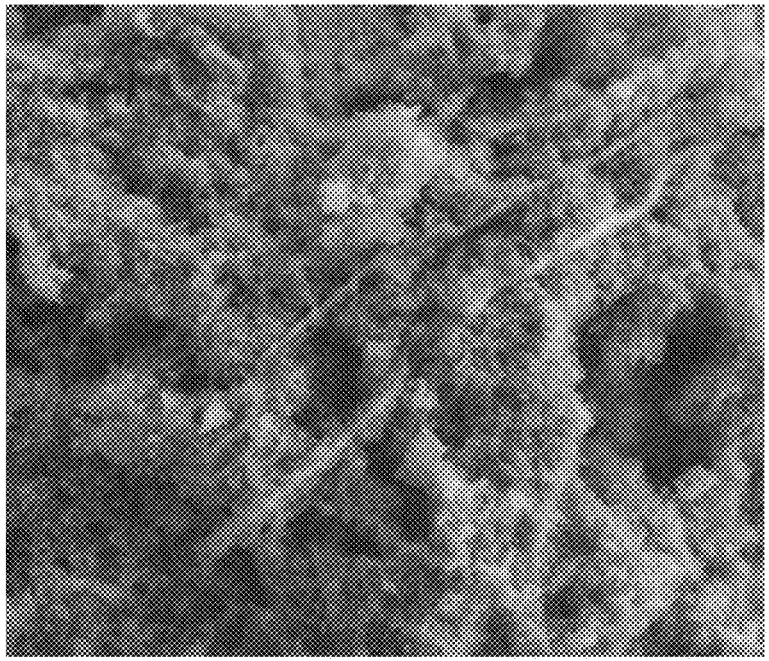
FIG. 11 is a scanning electron microscope image of another calcium phosphate composition.
Figure 12:
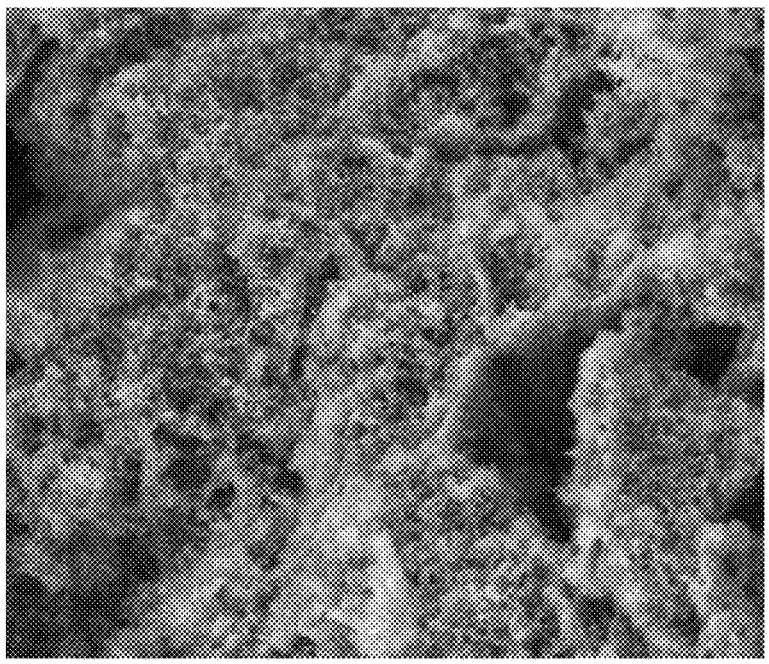
FIG. 12 is a scanning electron microscope image of a further calcium phosphate composition.
Figure 13:
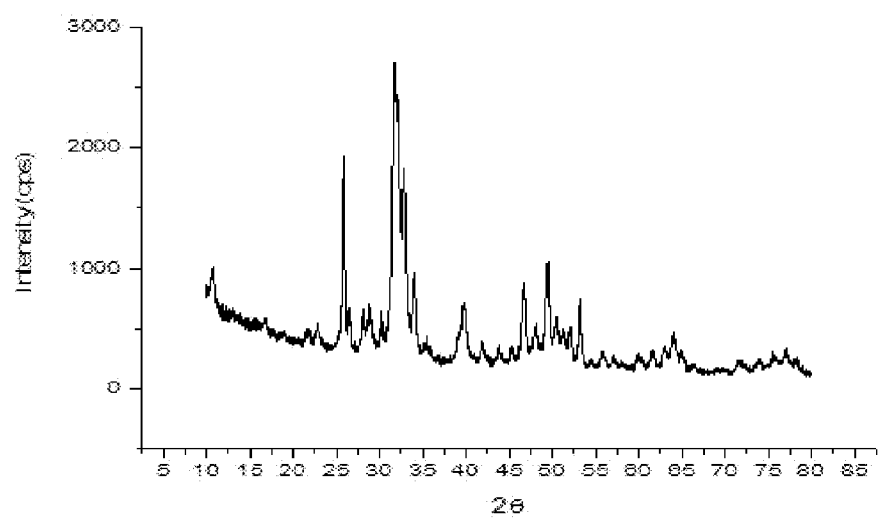
FIG. 13 is a plot showing x-ray scattering intensity as a function of angle for a calcium phosphate composition.
Figure 14:
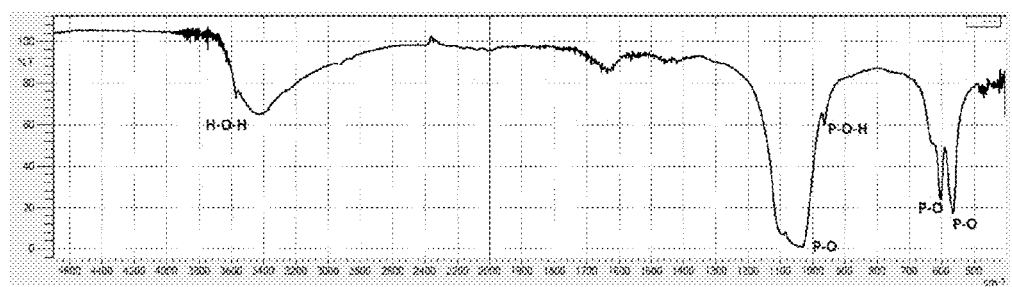
FIG. 14 is a plot showing infrared transmittance as a function of wavenumber (i.e., an infrared absorption spectrum) for the composition of FIG. 13.

SEM images of several of the samples were obtained. FIGS. 8A-8C are SEM images of sample CP14 at different magnifications, FIGS. 9A and 9B are SEM images of sample CP15, FIGS. 10A and 10B are SEM images of sample CP16, FIG. 11 is a SEM image of sample CP19, and FIG. 12 is a SEM image of sample CP20. FIG. 13 is a plot showing x-ray scattering from sample CP14, and FIG. 14 is a plot showing infrared absorption measurements on sample CP14.

Specific surface area measurements were performed on samples CP14-CP19 using an Autosorb-6B instrument and degasser (from Quantachrome Instruments, Germany), using the BET method. Nitrogen was used for adsorption and desorption measurements. Measured specific surface areas (in units of $m^2/g$ for samples CP14-CP19 were 62.4, 47.5, 39.7, 60.5, 61.5, and 60.8, respectively. Specific porosity measurements were also performed using the same analysis method; for each of the samples, specific porosity was between 25 $cm^3/g$ and 35 $cm^3/g$.

Table 6 shows reaction conditions for and properties for the various HA-containing samples. In Table 6, data in the "Post-Isol. Treatment" column indicates temperatures and duration of any post-isolation processing of the samples. Data in the "Phases" column indicates identified phases in the samples, data in the "Cryst. (%)" column indicates measured crystallinity values for the samples, and data in the "Surface Area ($m^2/g$)" column corresponds to surface area measurements for the samples, in units of $m^2/g$.

TABLE 6

Properties of samples CP14-CP27

| Sample | Post-Isol. Treatment | Phases | Cryst. (%) | Surface Area ($m^2/g$) |
|---|---|---|---|---|
| CP14 | 200° C. | 27% DCPA 73% HA | 61.64 | |
| CP15 | 500° C., 1 hour | 14% β-TCPM 86% HA | 59.88 | |
| CP16 | 600° C., 1 hour | 15% β-TCPM 85% HA | 57.44 | |
| CP17 | | 18% DCPA 82% HA | 58.44 | |
| CP19 | | 30% DCPA 70% HA | 55.36 | 49.769 |
| CP20 | | 45% DCPA 55% HA | 68.11 | 30.917 |
| CP22 | | HA | 56.30 | |
| CP23 | | 45% DCPA 55% HA | 68.11 | 30.917 |
| CP24 | | β-TCPM HA | 64.67 | 23.756 |
| CP27 | | HA | 59.07 | 47.063 |
| CP28 | | 10% DCPA 90% HA | 64.44 | 85.191 |

Example 11. Synthesis of Monophasic and Multiphasic Compositions

A series of calcium phosphate compositions designated CP02-CP11 and RWK03-RWK21 were prepared using the general methods disclosed herein.

To prepare samples CP02-CP11, a solution of 163 kg of reactive CaO dissolved in 1800 L of deionized water was prepared, agitating for 20 minutes to complete dissolution, forming a Ca(OH)$_2$ solution. The solution was filtered using mesh sieves #100 (149 μm) and #140 (105 μm). A 50% phosphoric acid solution was also prepared by dissolving 512 kg of solid phosphoric acid in 1536 kg of deionized water. The phosphoric acid solution was added to the Ca(OH)$_2$ solution at a rate of 12.8 kg/min. with constant agitation over a total time period of 40 minutes. The final pH of the calcium dihydrogen phosphate slurry that formed was 2.30.

A second Ca(OH)$_2$ solution was prepared by dissolving 250 kg of reactive CaO in 3000 kg of deionized water over a period of 20 minutes with constant agitation. The second Ca(OH)$_2$ solution was filtered using sieves #100 (149 μm) and #140 (105 μm).

The second Ca(OH)$_2$ solution was then added to the calcium dihydrogen phosphate slurry, with controlled agitation, for 150 minutes. Agitation of the slurry was stopped after addition of the second Ca(OH)$_2$ solution.

The samples were dried as discussed above at a temperature between 200° C. and 400° C. Certain samples (CP02, CP03, CP04, CP06, CP08, CP10, and CP11) were then subjected to post-isolation heating at a temperature of between 700-800° C. for a time period of between 1-2 hours, as follows: CP02, 700° C., 1.5 hours; CP03, 800° C., 2 hours; CP04, 700° C., 1 hour; CP06, 800° C., 1 hour; CP08, 800° C., 1 hour; CP10, 700° C., 1 hour; and CP11, 800° C., 2 hours.

Properties of the various samples, measured as discussed above, are shown in Table 7. In Table 7, data in the "Final pH" column indicate the pH of the product solution after the second Ca(OH)$_2$ solution has been added, and data in the "Post-Isol. Treatment" column correspond to heating temperatures and times to which the calcium phosphate products were subjected following isolation. Data in the "Phases" column indicate the identified phases in various samples, and data in the "Cryst. (%)" column correspond to measured crystallinity values for the samples.

TABLE 7

Properties of samples CP02-CP11

| Sample | Final pH | Post-Isol. Treatment | Phases | Cryst. (%) |
|---|---|---|---|---|
| CP02 | | 700° C., 1 hour | HA | 77.81 |
| CP03 | 7 | 800° C., 2 hours | HA | 94.52 |
| CP04 | 7 | 700° C., 1 hour | HA | 86.65 |
| CP05 | | | 42% HA 58% DCPD | 57.78 |
| CP06 | 7 | 800° C., 1 hour | 25% HA 75% β-TCP | 89.30 |
| CP07 | | | 37% HA 63% DCPD | 57.76 |
| CP08 | | 800° C., 1 hour | 36% HA 64% β-TCP | 90.87 |
| CP09 | 7 | 400° C. | HA | 53.67 |
| CP10 | 7 | 700° C., 1 hour | HA | 71.52 |
| CP11 | 7 | 800° C., 2 hours | HA | 93.87 |

To prepare samples RWK03-RWK21, a solution of 163 kg of reactive CaO dissolved in 1630 L of deionized water was prepared, agitating for 20 minutes to complete dissolution, forming a Ca(OH)$_2$ solution. The solution was filtered using mesh sieves #100 (149 μm). A 50% phosphoric acid solution was also prepared by dissolving 458 kg of solid phosphoric acid in 916 kg of deionized water. The phosphoric acid solution was added to the Ca(OH)$_2$ solution at a rate of 11.45 kg/min. with constant agitation over a total time period of 40 minutes. The final pH of the calcium dihydrogen phosphate slurry that formed was 2.65.

A second Ca(OH)$_2$ solution was prepared by dissolving 250 kg of reactive CaO in 2500 kg of deionized water over a period of 20 minutes with constant agitation. The second Ca(OH)$_2$ solution was filtered using sieves #100 (149 μm).

The second Ca(OH)$_2$ solution was then added to the calcium dihydrogen phosphate slurry, with controlled agitation, for 150 minutes. Agitation of the slurry was stopped after addition of the second Ca(OH)$_2$ solution. The samples were dried as discussed above at a temperature between 200° C. and 400° C.

Properties of the various samples, measured as discussed above, are shown in Table 8. In Table 8, data in the "Final pH" column indicate the pH of the product solution after the second Ca(OH)$_2$ solution has been added, data in the "Phases" column indicate the identified phases in various samples, and data in the "Surface Area (m$^2$/g)" column correspond to measured surface values for the samples, in units of m$^2$/g.

TABLE 8

Properties of samples RWK03-RWK21

| Sample | Final pH | Phases | Surface Area (m$^2$/g) |
|---|---|---|---|
| RWK03 | 6 | DCPA | 26.90 |
| RWK04 | 12.97 | CPP β-TCP | 15.34 |
| RWK07 | 13 | β-TCP | 10.30 |
| RWK08 | 13.02 | β-TCP | 11.79 |
| RWK09 | 13.02 | β-TCP | 9.044 |
| RWK10 | 13 | β-TCP | 8.727 |
| RWK11 | 13 | β-TCP | 8.253 |
| RWK12 | 13 | β-TCP | 8.263 |
| RWK13 | 12.98 | β-TCP | 9.429 |
| RWK14 | 12.99 | DCPA | 42.10 |
| RWK15 | 12.96 | DCPA | 34.15 |
| RWK16 | 12.86 | DCPA | 48.97 |
| RWK17 | 5.40 | β-TCP CPP | 11.37 |
| RWK18 | 8.09 | β-TCP CPP | 8.80 |
| RWK19 | 8.60 | β-TCP CPP | 9.143 |
| RWK20 | 8.73 | β-TCP CPP | 3.673 |
| RWK21 | 9.29 | β-TCP Ca$_5$(PO$_4$)$_3$(OH) | 2.271 |

Example 12. Controlled Variation of Reaction Conditions

To investigate the effects of variations in stoichiometry on the chemical and physical properties of the calcium phosphate compositions produced using the methods disclosed herein, a large number of calcium phosphate compositions were prepared under varying conditions. The reagents and conditions are summarized in Table 6 below.

TABLE 9

Summary of Reagents and Conditions for Controlled Synthesis

| Sample | Final pH | Heating | Phases | Cryst. (%) | SSA (m$^2$/g) |
|---|---|---|---|---|---|
| 1 | 7 | 700° C. - 1 h | β-TCP | 96.35 | |
| 2 | 7 | 800° C. - 1 h | β-TCP | 97.37 | |

TABLE 9-continued

Summary of Reagents and Conditions for Controlled Synthesis

| Sample | Final pH | Heating | Phases | Cryst. (%) | SSA (m²/g) |
|---|---|---|---|---|---|
| 3 | 7 | 850° C. - 4 h | β-TCP | 99.30 | |
| 4 | 7 | 900° C. - 1 h | β-TCP | 98.25 | |
| 5 | 11 | 700° C. - 3.5 h | 5% β-TCP 95% HA | 79.91 | |
| 6 | 11 | 700° C. - 2.5 h | 5% β-TCP 95% HA | 80.38 | |
| 7 | 11 | 700° C. - 1 h | 5% β-TCP 95% HA | 78.31 | |
| 8 | 7 | 950° C. - 1 h | 5% β-TCP 95% HA | 96.74 | |
| 9 | 7 | 200° C. | HA | 49.94 | |
| 10 | 7 | 800° C. - 2 h | HA | 91.48 | |
| 11 | 7 | 200° C. | 10% DCPA 90% HA | 54.10 | |
| 12 | 7 | 400° C. - 1 h | HA | 53.67 | |
| 13 | 7 | 650° C. - 1 h | HA | 71.52 | |
| 14 | 7 | 700° C. - 1 h | HA | 77.92 | |
| 15 | 6 | 700° C. - 1 h | HA | 84.88 | |
| 16 | 7 | 800° C. - 1 h | 50% β-TCP 20% HA 30% β-TCPM | 88.08 | |
| 17 | 7 | 950° C. - 3.5 h | 60% β-TCP 40% β-TCPM | 99.13 | |
| 18 | 7 | 200° C. | 75% DCPD 15% DCPA 10% HA | 73.05 | |
| 19 | 7 | 200° C. | 22% DCPD 78% HA | 48.22 | |
| 20 | 7 | 1000° C. - 1 h | 15% β-TCP 85% HA | 96.73 | |
| 21 | 12 | 800° C. - 1 h | 43% β-TCP 57% HA | 88.95 | |
| 22 | 11 | 200° C. | 23% HA 77% DCPD | 74.87 | |
| 23 | 7 | 950° C. - 4 h | 39% β-TCP 61% HA | 93.55 | |
| 24 | 7 | 200° C. | HA | 40.96 | |
| 25 | 7 | 950° C. - 4 h | 21% β-TCP 79% HA | 96.42 | |
| 26 | 9 | 200° C. | 60% DCPD 30% HA 10% DCPA | 40.46 | |
| 27 | 7 | 800° C. - 1 h | 22% HA 78% β-TCP | 90.88 | 9.365 |
| 28 | 7 | 800° C. - 1 h | 32% HA 78% β-TCP | 90.75 | 10.127 |
| 29 | 10 | 200° C. | 50% DCPD 45% HA 5% DCPA | 59.87 | |
| 30 | 7 | 200° C. | 43% DCPA 57% HA | 55.14 | |
| 31 | 12 | 200° C. | 70% DCPA 20% DCPD 10% HA | 83.54 | |
| 32 | 12 | 200° C. | 60% HA 20% DCPD 20% DCPA | 77.48 | |
| 33 | 12 | 700° C. - 1 h | 14% β-TCP 86% HA | 81.61 | |
| 34 | 6 | 200° C. | 60% DCPD 25% DCPA 15% HA | 74.80 | |
| 35 | 6 | 250° C. | 50% DCPA 30% DCPD 20% HA | 66.01 | |
| 36 | 6 | 200° C. | HA | 55.78 | |
| 37 | 7 | 800° C. - 1 h | 28% HA 72% β-TCP | 84.57 | |
| 38 | 7 | 700° C. - 1 h | HA | 74.92 | |
| 39 | 6 | 700° C. - 1 h | 5% β-TCP 95% HA | 79.95 | |
| 40 | 7 | 700° C. - 1.5 h | 24% β-TCP 76% HA | 81.15 | |
| 41 | 7 | 700° C. - 1.5 h | 90% HA 10% β-TCP | 84.07 | 11.849 |
| 42 | 7 | 200° C. | HA | 51.85 | 81.500 |
| 43 | 6 | 250° C. | HA | 50.72 | |
| 44 | 7 | 700° C. - 1 h | HA | 78.23 | |
| 45 | 7 | 750° C. - 1 h | 40% β-TCP 60% HA | 76.57 | |
| 46 | 11 | 200° C. | 8% DCPA 92% HA | 50.97 | |
| 47 | 6 | 200° C. | 10% DCPD 50% DCPA 40% HA | 52.98 | |
| 48 | 6.5 | 750° C. - 1.5 h | 80% β-TCP 20% β-TCPM | 90.54 | |
| 49 | 7 | 200° C. | 30% HA 70% DCPA | 62.20 | |
| 50 | 6 | 200° C. | HA | 63.48 | |
| 51 | 6 | 200° C. | 23% DCPA 77% HA | 60.89 | 35.618 |
| 52 | 6 | 700° C. | 8% HA 92% β-TCP | 93.30 | 4.485 |
| 53 | 6 | 200° C. | 27% DCPA 73% HA | 61.64 | 62.400 |
| 54 | 6 | 600° C. - 1 h | 60% HA 32% β-TCP 8% β-TCPM | 57.41 | |
| 55 | 6 | 640° C. - 1 h | HA β-TCP β-TCPM | 85.00 | 6.350 |
| 56 | 6 | 600° C. - 1 h | HA β-TCP β-TCPM | 56.32 | |
| 57 | 6 | 600° C. - 40 min | HA β-TCPM | 60.37 | |
| 58 | 6 | 200° C. | 18% DCPA 82% HA | 58.44 | |
| 59 | 6 | 900° C. - 3 h | 8% β-TCP 92% HA | 94.03 | |
| 60 | 6 | 200° C. | 45% DCPA 55% HA | 68.11 | 30.917 |
| 61 | 6 | 900° C. | 15% β-TCP 85% HA | 92.82 | |
| 62 | 6 | 600° C. | HA β-TCP β-TCPM | 67.31 | |
| 63 | 6 | 200° C. | HA β-TCPM | 67.31 | 26.070 |
| 64 | 6 | 250° C. | HA β-TCPM | 64.97 | 23.756 |
| 65 | 6 | 250° C. | 59% DCPA 41% HA | 62.55 | 34.131 |
| 66 | 7 | 250° C. | HA | 62.00 | |
| 67 | 6 | 500° C. | HA | 57.00 | 34.935 |
| 68 | 7.68 | 200° C. | HA | 59.71 | |
| 69 | 7 | 200° C. | HA | 53.80 | |
| 70 | 7 | 200° C. | 5% DCPA 95% HA | 57.23 | |
| 71 | 10.49 | 250° C. | HA | 61.54 | 49.097 |
| 72 | 8.57 | 200° C. | HA | 65.79 | |
| 73 | 6.59 | 400° C. | HA | 59.07 | 69.071 |
| 74 | 6.59 | 200° C. | HA | 58.43 | |
| 75 | 6.59 | 400° C. | HA | 59.62 | |
| 76 | 6.59 | 500° C. - 1 h | HA | 57.98 | |

To prepare each of samples 1-76, two solutions of CaO in water were prepared as discussed above. The first solution was combined with $H_3PO_4$ solution, lowering the pH of the combined solution in steps as shown in FIG. 3. The second solution of CaO in water was then added, raising the pH of the product solution to the value shown in column 2 of Table 9.

For each of samples 1-76 in Table 9, data in the columns of the table indicate the various reaction conditions used and product properties. The data in the "Final pH" column indicate the final pH of the product slurry after all of the Ca(OH)$_2$ from the second Ca(OH)$_2$ solution was added to the aqueous slurry of Ca(H$_2$PO$_4$)$_2$. Data in the "Heating" column indicate the conditions of any post-isolation heat treatment of the calcium phosphate compositions obtained, including the temperature to which particles of the composition were heated and the duration of the heat treatment at that temperature.

Data in the "Phases" column indicates the observed phases in each of the product calcium phosphate compositions that were synthesized. Some of the compositions were observed to be monophasic, while others were biphasic or triphasic. The percentages indicate the relative amounts of each phase compound in the overall composition, and the acronyms indicate the chemical nature of the phases. In each of the samples, the various phases were identified using x-ray diffractometry, infrared spectroscopy, and/or Raman spectroscopy. In x-ray diffraction experiments, each of the phases generates a unique pattern of scattering peaks that acts as a "fingerprint" for the phase. Similarly, in both infrared and Raman spectroscopy, each phase generates a unique set of peaks that represent vibrational resonances among atoms in the phase, and similarly functions as a fingerprint for identification of the phase.

Data in the "Cryst. (%)" column indicate the percent crystallinity measured for each sample using x-ray diffraction techniques. Data in the "SSA (m$^2$/g)" column correspond to measured values of specific surface area for the samples, in units of m$^2$/g, measured by dry N2 adsorption using the BET method.

(1) Control of Calcium Phosphate Composition Phases

As is evident from the data shown in the foregoing examples, the methods disclosed herein provide for controlled synthesis of monophasic, biphasic, and triphasic calcium phosphate compositions. The methods also permit a variety of different calcium phosphate compounds to be synthesized as the constituent phases in biphasic and triphasic compositions. Further, the methods permit the relative proportions of the different phases to be varied in a systematic way.

For example, samples 9, 10, 12-15, and 42-44 in Table 9 each correspond to a calcium phosphate composition formed of pure hydroxyapatite. Among these samples, the final pH and post-isolation heat treatment differed. However, the molar ratios of Ca$^{2+}$ ions to H$_2$PO$_4^-$ ions that were used to produce the compositions yielded a common monophasic product, albeit with differences in certain physical properties.

Samples 1-4 in Table 9 each correspond to a calcium phosphate composition formed of pure β-TCP. Among these samples as well, the post-isolation heat treatments differed, but the molar ratios of Ca$^{2+}$ ions to H$_2$PO$_4^-$ ions that were used to produce the compositions yielded a monophasic product with the same chemical identity, and differences only in certain physical properties.

Biphasic calcium phosphate compositions with different phases can also be readily formed. For example, samples 5-7, 20, 21, 23, 25, 27, 33, 37, and 40 in Table 9 each correspond to biphasic calcium phosphate compositions with phases of β-TCP and HA. Among these samples, the proportion of β-TCP varied from 5% to 78%, and the proportion of HA varied from 95% to 22%. This variation in phase composition among the various samples was primarily due to differences in the molar ratios of Ca$^{2+}$ ions to H$_2$PO$_4^-$ ions that were used to produce the compositions. The variation was also partly attributable to post-isolation processing of the samples at elevated temperature, which tends to shift the phase composition of biphasic and triphasic products slightly. Based on the data from these samples, and from the pure monophasic β-TCP and HA compositions discussed above, biphasic calcium phosphate compositions featuring phases of β-TCP and HA can be produced using the methods disclosed herein such that the relative proportions of β-TCP and HA can be any amount from nearly 0% to nearly 100% in the compositions, through suitable variation of the molar ratios of Ca$^{2+}$ ions to H$_2$PO$_4^-$ ions that are used to produce the compositions, and post-isolation processing of the compositions at elevated temperature. Interpolating and/or extrapolating the ion molar ratios between values corresponding to specific examples in Table 9 will nominally yield compositions approximating any desired phase distribution of β-TCP and HA in biphasic calcium phosphate compositions.

Samples 30, 46, 49, 51, 53, 58, 60, 65, and 70 in Table 9 each correspond to biphasic calcium phosphate compositions with phases of DCPA and HA, where the relative proportions of each phase vary among the samples. Among the samples, the relative proportion of DCPA varies from 5% to 70%, and the relative proportion of HA varies from 95% to 30%. As with the biphasic β-TCP and HA compositions discussed above, the relative proportions of both DCPA and HA can be adjusted in a systematic manner by selecting suitable values for the molar ratio of Ca$^{2+}$ ions to H$_2$PO$_4^-$ ions that are used to produce the compositions, and for smaller adjustments, changing the post-isolation processing temperature. Interpolating and/or extrapolating the ion molar ratios between values corresponding to specific examples in Table 9 will nominally yield compositions approximating any desired phase distribution of DCPA and HA in biphasic calcium phosphate compositions, with the relative proportion of each phase in any amount from nearly 0% to nearly 100%.

Samples 19 and 22 in Table 9 correspond to biphasic calcium phosphate compositions with phases of DCPD and HA. The relative proportions of the phases in the two samples are almost exactly opposite. Biphasic compositions with DCPD and HA in amounts intermediate between the proportions shown in samples 19 and 22, or in amounts larger or smaller than the proportions in the two samples, can readily be prepared by interpolating or extrapolating the molar ratios of Ca$^{2+}$ ions to H$_2$PO$_4^-$ ions that are used to produce the compositions of samples 19 and 22 in Table 9. In this manner, biphasic compositions approximating any desired phase distribution of DCPD and HA—from nearly 0% to nearly 100% of each compound—can be produced using the methods disclosed herein.

Triphasic calcium phosphate compositions with systematically varying relative proportions of each of three phases can also be produced using the methods disclosed herein. Samples 18, 26, 29, 31, 32, 34, 35 and 47 in Table 9 correspond to triphasic calcium phosphate compositions with phases of DCPD, DCPA, and HA, where the relative proportions of each phase vary among the samples. Among the various samples, the relative fraction of the DCPD phase varies from 10% to 75%, the relative fraction of the DCPA phase varies from 5% to 70%, and the relative fraction of the HA phase varies from 10% to 60%. Among the various samples, any of the three phases can be present in the largest concentration (for example, 75% DCPD in sample 18, 70% DCPA in sample 31, and 60% HA in sample 32). In addition, the relative amounts of the two minor constituents of the composition can also be varied systematically. Comparing samples 18 and 26, for example, in which DCPD is the majority phase, either DCPA or HA can be made the next most abundant phase. Comparing samples 35 and 47 in which DCPA is the majority phase, either DCPD or HA can be made the next most abundant phase. And comparing samples 29 and 47, where HA is present at relatively high concentration, either DCPD or DCPA can be present in highest concentration.

The relative proportions of DCPD, DCPA, and HA in the triphasic calcium phosphate compositions are determined to a significant extent by the molar ratios of $Ca^{2+}$ ions to $H_2PO_4^-$ ions that are used to produce the compositions. Accordingly, the relative proportions of the three phases in the compositions can be adjusted in a systematic manner by selecting suitable values for the molar ratios, and for smaller adjustments, changing the post-isolation processing temperature. Interpolating and/or extrapolating the ion molar ratios between values corresponding to specific examples in Table 9 will nominally yield compositions approximating any desired phase distribution of DCPD, DCPA, and HA in triphasic calcium phosphate compositions, with the relative proportion of each phase in any amount from nearly 0% to nearly 100%.

(2) Control of Calcium Phosphate Composition Surface Area

The surface area of the calcium phosphate compositions produced according to the methods disclosed here can be controlled in various ways. The specific surface area of the compositions is directly related to the presence of pores and channels in particles of the compositions. In general, the larger the number of such pores and channels, the larger the surface area of the product compositions.

The porosity, and therefore the surface area, of the compositions can be adjusted both chemically and physically. To increase the surface area of the compositions, the porosity of product particles can be increased by subjecting the particles to a physical thermal shock treatment as discussed above, which introduces pores into the particle structure as steam is liberated from the particle interiors. Multiple thermal shock treatments can be used to increase the porosity of the product particles, such that the surface area of the product composition can be systematically controlled over a wide range.

The porosity and surface area of the product compositions can also be controlled by adjusting the final pH of the product slurry, by controlling the amount of $Ca(OH)_2$ solution that is added to the dihydrogen phosphate-based intermediate species. In general, compositions formed at higher pH values have smaller pores and smaller aggregate surface area. Adjusting the slurry pH by changing the amount of $Ca(OH)_2$ solution that is added provides a chemical method for controlling the specific surface area of the product compositions.

As evidenced by the examples disclosed herein, compositions with a wide range of specific surface areas can be produced using the above methods. In some embodiments, for example, the surface area of a calcium phosphate composition produced as disclosed herein is 30 $m^2/g$ or more (e.g., 40 $m^2/g$ or more, 50 $m^2/g$ or more, 60 $m^2/g$ or more, 70 $m^2/g$ or more, 80 $m^2/g$ or more, 85 $m^2/g$ or more, 90 $m^2/g$ or more).

Compositions with a wide range of specific porosities can also be produced. In certain embodiments, for example, the porosity of a calcium phosphate composition produced as disclosed herein is 20 $cm^3/g$ or more (e.g., 25 $cm^3/g$ or more, 30 $cm^3/g$ or more, 35 $cm^3/g$ or more, 40 $cm^3/g$ or more, 45 $cm^3/g$ or more, 50 $cm^3/g$ or more, or even more).

(3) Control of Calcium Phosphate Composition Crystallinity

The methods disclosed herein can be used to produce a variety of different monophasic, biphasic, and triphasic calcium phosphate compositions with systemically controlled crystallinity. In general, the crystallinity of the product composition depends upon the chemical nature of the composition, the post-isolation processing temperature (if any), and the post-isolation processing time. Typically, as the post-isolation processing temperature increases, the product composition's crystallinity increases. Similarly, as the processing time increases, the composition's crystallinity increases.

The samples in Table 9 demonstrate control and selectivity over crystallinity for a variety of different products. For example, samples 1-4 correspond to a monophasic calcium compositions formed from pure β-TCP. By increasing the post-isolation processing temperature and time, the crystallinity of the products can be varied from 96.35% to 99.30%.

Similarly, samples 9, 10, and 12-14 correspond to monophasic calcium phosphate compositions formed from pure HA. Among the samples, increasing the post-isolation processing temperature and time changes the product crystallinity in a systematic manner from 49.94% to 91.48%.

The product crystallinity can also be systematically adjusted through control of the post-isolation processing temperature and time for multiphasic product compositions. Samples 5-8 and 39 correspond to biphasic product compositions with phases of β-TCP and HA. The crystallinity of these samples is varied in a controlled manner from 78.31% to 96.74%.

For biphasic and triphasic product compositions, the same general principle applies—increasing the post-isolation processing temperature and processing time typically results in increased crystallinity in the product. However, in these more complex compositions, the crystallinity of the product also depends on the relative proportions of the various phases present and the chemical nature of those phases. In addition, post-isolation heating can modify the chemical nature and relative proportions of the phases present in the composition. Thus, for example, samples 26, 34, and 35 each correspond to triphasic compositions with phases of DCPD, HA, and DCPA. In sample 26, processed at 200° C., the ratio of DCPD:HA:DCPA was 60:30:10, and the crystallinity was 40.46% In sample 34, processed at 200° C., the ratio of DCPD:HA:DCPA was 60:15:25, and the crystallinity was 74.80%. In sample 35, processed at 250° C., the ratio of DCPD:HA:DCPA was 50:20:30, and the crystallinity was 66.01%. Comparing samples 26 and 34, the relative fraction of HA in the product composition decreased and the fraction of DCPA increased, leading to an increase in the product's crystallinity. Comparing samples 34 and 35, in sample 35 the relative fraction of HA in the product composition increased in relation to sample 34 while the relative fraction of DCPD was reduced. The crystallinity of sample 35 was therefore reduced in relation to sample 34, even though sample 35 was processed at a slightly higher temperature.

All other factors being equal, increasing the post-isolation processing temperature and processing time yields product compositions with higher crystallinity, and by interpolating between, and extrapolating from, processing conditions for the samples shown in Table 6, products with desired levels of crystallinity can be obtained for a wide variety of monophasic, biphasic, and triphasic product compositions. In general, the crystallinity for calcium phosphate compositions produced according to the methods disclosed herein can be 40% or greater (e.g., 50% or greater, 60% or greater, 70% or greater, 80% or greater, 90% or greater, 95% or greater, 98% or greater, 99% or greater, 99.5% or greater).

(4) Control of Calcium Phosphate Composition Particle Size/Aspect Ratio

The methods disclosed herein can be used to produce calcium phosphate compositions formed of nanometer-sized individual particles of high aspect ratio. Nanometer-sized particles can be advantageous for a number of applications in which the particles act as hosts for other chemical agents, and decompose when injected or otherwise introduced into a living organism. By producing particles with a controlled range of sizes in the nanometer regime, the in vivo decomposition rate of the particles can be controlled. Further, high aspect ratio calcium phosphate particles are advantageous because the particles flow more easily through body lumens than bulkier particles of smaller aspect ratio. As such, they can be better suited to certain in vivo applications than other lower aspect ratio particles.

In particular, high aspect ratio calcium phosphate particles have shapes that are similar to the natural morphology of certain calcium phosphates in biological structures such as teeth and bone. As such, the high aspect ratio particles have advantageous biomimetic properties, and can be used as replacements for the naturally occurring calcium phosphate compounds. The properties of the high aspect ratio particles mimic the properties of their naturally occurring counterparts in biological structures. In particular, the high aspect ratio shape yields particles with particular ranges of porosity such that organic material in blood and other body fluids can penetrate the particles, while at the same time, the particles provide a suitably dense scaffold for cellular regeneration and growth. As such, the high aspect ratio calcium phosphate particles produced as disclosed herein are particularly useful for applications in which bio-integration is a significant consideration.

Particles of the calcium phosphate compositions disclosed herein are characterized by their maximum dimension, which corresponds to the largest linear distance between any two points on the particle surface, as measured in a two dimensional image of the particle. Examples of SEM images of particles of some of the samples described herein are shown in FIGS. 8A-8C, 9A-9B, and 10A-10B. In these figures, the particles are formed as tiny crystallites with generally elongated shapes. In general, particles of the calcium phosphate compositions prepared according to the methods disclosed herein can have an average maximum dimension of between 100 nm and 500 nm (e.g., between 100 nm and 400 nm, between 100 nm and 300 nm, between 150 nm and 400 nm, between 150 nm and 300 nm, between 175 nm and 400 nm, between 175 nm and 300 nm, between 200 nm and 400 nm).

The aspect ratio of a particle is the ratio of the particle's maximum dimension (measured as discussed above) to its largest dimension in a direction orthogonal to the maximum dimension in the plane of a two dimensional image of the particle. Like the maximum particle dimension, a particle's aspect ratio can be determined from an image of the particle such as an SEM image. As shown in FIGS. 8A-8C, 9A-9B, and 10A-10B, the methods disclosed herein can be used to produce particle compositions in which the average aspect ratio for the particles is relatively larger. For example, particles of the calcium phosphate compositions prepared according to the methods disclosed herein can an average aspect ratio of 50:1 or more (e.g., 75:1 or more, 100:1 or more, 150:1 or more, 200:1 or more, 250:1 or more, 300:1 or more). Post-isolation processing at elevated temperature typically yields higher aspect ratio particles. By increasing the temperature and/or the processing time, particle compositions with higher average aspect ratios can be produced.

OTHER EMBODIMENTS

A number of embodiments have been described. Nevertheless, it will be understood that various modifications may be made without departing from the spirit and scope of the disclosure. Accordingly, other embodiments are within the scope of the following claims.

What is claimed is:

1. A method, comprising:
obtaining a first plurality of particles comprising calcium carbonate, wherein each particle has a particle size corresponding to a maximum dimension of the particle, wherein a distribution of the particle sizes for the first plurality of particles has a minimum size corresponding to a smallest particle in the first plurality of particles and a maximum size corresponding to a largest particle in the first plurality of particles, and wherein a difference between the maximum and minimum sizes is 4 mm or less; and
heating the first plurality of particles to a temperature of between 900° C. and 1200° C. for a time period of at least 1 hour to generate a second plurality of particles comprising calcium oxide.

2. The method of claim 1, wherein the minimum size is between 4 mm and 12 mm and the maximum size is between 8 mm and 16 mm.

3. The method of claim 1, wherein a concentration of calcium carbonate in the first plurality of particles is at least 94%.

4. The method of claim 1, wherein a concentration of calcium carbonate in the first plurality of particles is at least 98%.

5. The method of claim 1, wherein a concentration of calcium carbonate in the second plurality of particles is less than 0.5%.

6. The method of claim 1, wherein a concentration of calcium carbonate in the second plurality of particles is less than 0.1%.

7. The method of claim 1, wherein an efficiency of conversion of calcium carbonate in the first plurality of particles to calcium oxide in the second plurality of particles is 95% or greater.

8. The method of claim 7, wherein the efficiency of conversion is 99% or greater.

9. The method of claim 1, wherein the first plurality of particles is heated to a temperature of between 1100° C. and 1200° C. to generate the second plurality of particles.

10. The method of claim 1, wherein the first plurality of particles is heated to a temperature of greater than 1000° C. to generate the second plurality of particles.

11. The method of claim 1, comprising increasing the temperature to which the first plurality of particles are heated during the time period.

12. The method of claim 11, comprising increasing the temperature in a sequence of steps during the time period, wherein at each successive step, the first plurality of particles are heated at a constant temperature that is higher than a temperature of an immediately preceding step, for a portion of the time period.

13. The method of claim 12, wherein the sequence of steps comprises at least three steps, and wherein:
a first step in the sequence comprises heating the first plurality of particles to a temperature of between 900° C. and 1000° C.;
a second step in the sequence comprises heating the first plurality of particles to a temperature of between 1000° C. and 1100° C.; and a third step in the sequence comprising heating the first plurality of particles to a temperature of between 1100° C. and 1200° C.

14. The method of claim 11, comprising continuously increasing the temperature to which the first plurality of particles are heated during the time period.

15. The method of claim 14, comprising increasing the temperature linearly between a first temperature of between 900° C. and 1000° C., and a second temperature of between 1100° C. and 1200° C.

16. The method of claim 1, wherein the time period is between 1 hour and 2 hours.

17. The method of claim 1, wherein the time period is between 2 hours and 3 hours.

18. The method of claim 2, wherein the difference between the maximum and minimum sizes is 3 mm or less.

19. The method of claim 2, wherein the difference between the maximum and minimum sizes is 2 mm or less.

20. The method of claim 1, wherein a specific surface area of the second plurality of particles is at least 10.0 $m^2/g$.

21. The method of claim 1, wherein a specific porosity of the second plurality of particles is at least 15.0 $cm^3/g$.

22. A composition, comprising:
a plurality of particles comprising a calcium oxide concentration of at least 99%,
wherein a surface area of the particles is at least 10.0 $m^2/g$ and a specific porosity of the particles is at least 15.0 $cm^3/g$.

23. The composition of claim 22, wherein the surface area of the particles is at least 14.0 $m^2/g$.

24. The composition of claim 22, wherein the surface area of the particles is at least 20.0 $m^2/g$.

25. The composition of claim 22, wherein the specific porosity of the particles is at least 20.0 $cm^3/g$.

26. The composition of claim 22, wherein the specific porosity of the particles is at least 30.0 $cm^3/g$.

* * * * *